Oct. 30, 1928.

A. M. CURTIS 1,689,328

SUBMARINE TELEGRAPH SYSTEM

Filed June 30, 1926

Inventor:
Austen M. Curtis:
by  W. Griggs  Att'y.

Oct. 30, 1928.

A. M. CURTIS 1,689,328

SUBMARINE TELEGRAPH SYSTEM

Filed June 30, 1926   16 Sheets-Sheet 8

Inventor:
Austen M. Curtis.
by   W. Griggs   Att'y.

Oct. 30, 1928.
A. M. CURTIS
1,689,328
SUBMARINE TELEGRAPH SYSTEM
Filed June 30, 1926 16 Sheets-Sheet 10
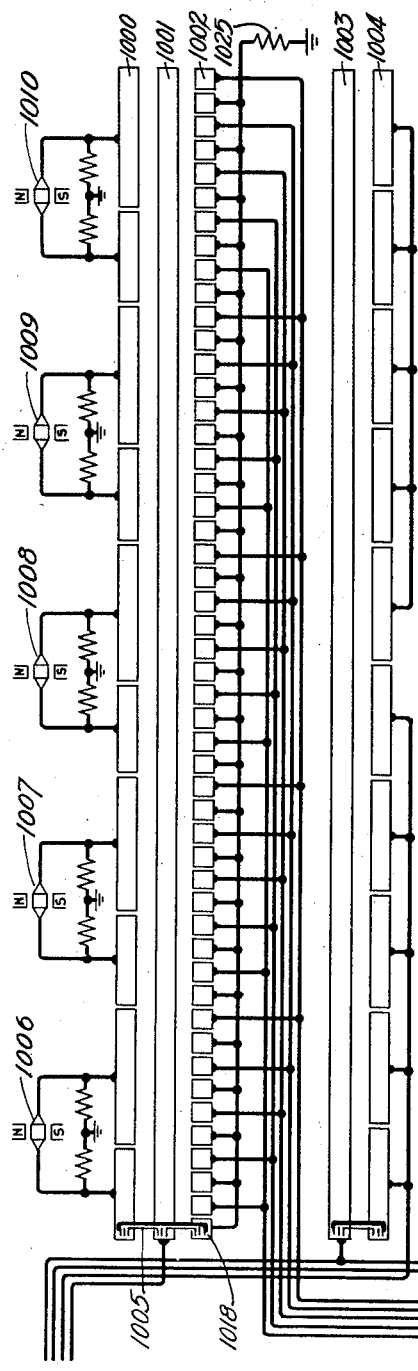
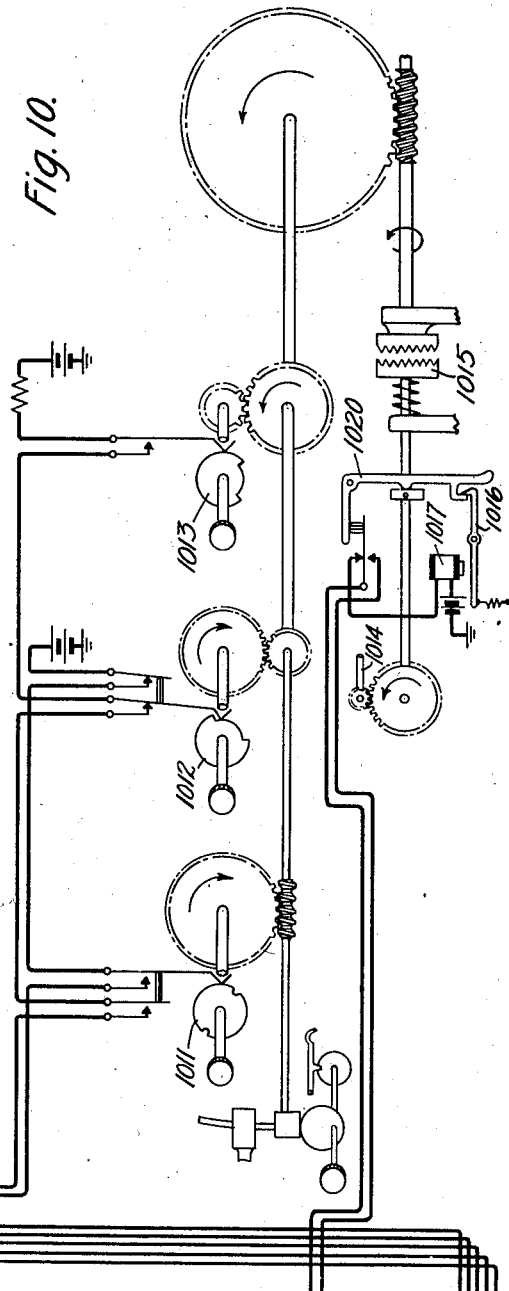
Fig. 10.
Inventor:
Austen M. Curtis.
by W. Griggs Att'y Oct. 30, 1928.

A. M. CURTIS 1,689,328

SUBMARINE TELEGRAPH SYSTEM

Filed June 30, 1926     16 Sheets-Sheet 11

Inventor:
Austen M. Curtis.
by E. W. Griggs    Att'y.

Oct. 30, 1928.

A. M. CURTIS 1,689,328

SUBMARINE TELEGRAPH SYSTEM

Filed June 30, 1926     16 Sheets-Sheet 13

Inventor:
Austen M. Curtis.
by E.W.Griggs   Att'y.

Oct. 30, 1928.

A. M. CURTIS 1,689,328

SUBMARINE TELEGRAPH SYSTEM

Filed June 30, 1926

Inventor:
Austen M. Curtis.
by  W. Griggs   Att'y.

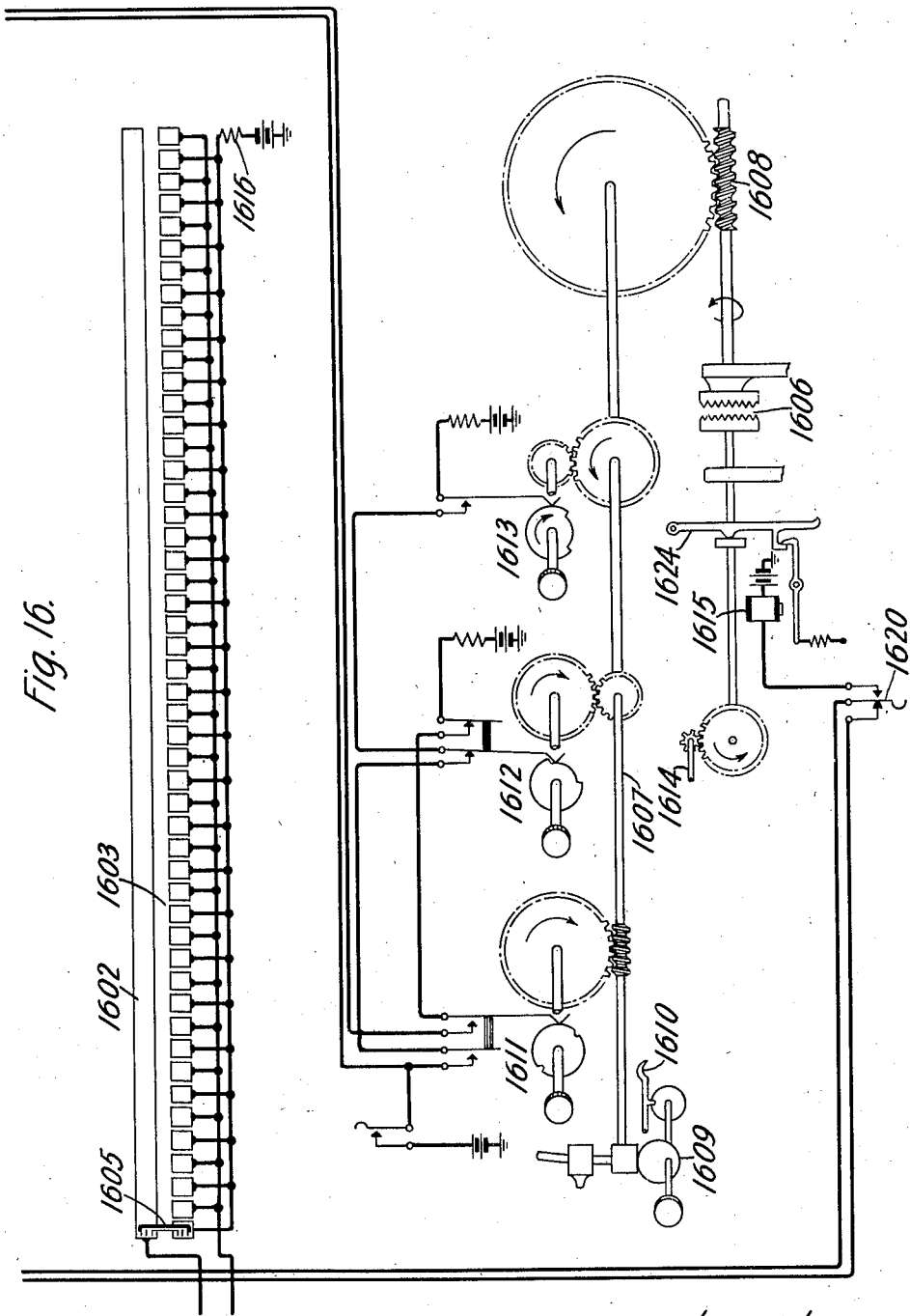

Patented Oct. 30, 1928.

1,689,328

UNITED STATES PATENT OFFICE.

AUSTEN M. CURTIS, OF EAST ORANGE, NEW JERSEY, ASSIGNOR TO BELL TELEPHONE LABORATORIES, INCORPORATED, OF NEW YORK, N. Y., A CORPORATION OF NEW YORK.

SUBMARINE TELEGRAPH SYSTEM.

Application filed June 30, 1926. Serial No. 119,537.

This invention relates to signaling systems and particularly to loaded submarine cable telegraph systems.

The broad object of this invention is to improve the operation of signaling systems of the type adapted for use with submarine cables and a more specific object is to increase the speed at which messages may be transmitted from one station to another over long, loaded, submarine telegraph cables.

The development of the highly permeable materials to which the name permalloy has been generically applied, has made it possible to provide a long submarine cable having electrical characteristics which permit signaling thereover with greatly decreased attenuation and distortion compared with cables heretofore used. However, at high operating speeds the duplex arrangement presents difficulties which have been avoided by adopting the simplex method with periodical reversals of the direction of transmission. Reference is made to U. S. Patents No. 1,586,884 granted to G. W. Elmen, June 1, 1926, No. 1,586,874 granted to O. E. Buckley, June 1, 1926, No. 1,521,870 granted to A. A. Clokey, January 6, 1925, No. 1,586,972 granted to A. M. Curtis, June 1, 1926, No. 1,601,941, granted to A. A. Clokey, October 5, 1926, and No. 1,654,328, granted to J. J. Gilbert, December 27, 1927. Certain details of the present system are covered in other patent applications, as will be pointed out hereinafter.

The present invention contemplates the improvement of the systems of the prior art by combining in a novel workable system, a long loaded cable and synchronized multiplex sending and receiving equipment together with shaping networks, amplifiers and vibrating relays constituting a system which permits a message rate in excess of 1200 characters per minute. In addition a unidirectional translating device is employed to supply the signals to the vibrating relay in such manner as to prevent the latter from affecting the synchronization.

In the complete system herein described by way of example and illustrated in the accompanying drawings, three stations are employed, two terminal stations and a relay station. The use of a relay station is desirable, since one terminal station is located at a considerable distance from the landing place of the submarine cable. When transmitting in one direction, say from west to east, the arrangement is briefly as follows. Five tape controlled transmitters are successively associated by a multiplex distributor with a land line leading to the relay station. Here one section of a distributor transfers the impulses to storing relays, which in turn transmit impulses by means of a second section of said distributor to the submarine cable through a sending network which shapes them. The distributor also interpolates ground intervals between the signal pulses to further improve their form. At the second terminal station the cable terminates in a shaping network having a high impedance with respect to the cable, the network being coupled by a transformer to a multi-stage amplifier. At the output of the amplifier are three relays. One of these relays comprises a unidirectional signaling arrangement including a relay, one winding of which is under control of the receiving distributor, and a vibrating relay. The signals are further transmitted by means of a printing relay and the receiving distributor to the receiving printers. The second relay controls the synchronization of the transmitting and receiving distributors by the clockhand method. The unidirectional character of the signaling arrangement renders the synchronization independent of inductive disturbances due to the vibrating relay. The third relay controls means for correcting for "zero wander."

After transmitting for a predetermined time, a series of contacts are closed which set in motion means for automatically reversing the direction of transmission. In changing the direction of transmission, the amplifier is connected in or shunted out in steps to prevent interference therewith, due to surges or other disturbances.

The arrangement of apparatus for transmission from east to west differs from the above in that the amplifier and signal relays are located at the relay station and the signaling and correcting pulses are transmitted over telegraph wires to the receiving apparatus at the terminal station.

A clearer understanding of the invention will be gained from a consideration of the following detailed description together with the appended drawings, in which;

Fig. 1 shows a schematic diagram of the system; Figs. 2 to 6 show the west terminal station; Figs. 7 to 10 show the relay station: and Figs. 11 to 16 show the east terminal station.

Fig. 10 shows the sending and transfer rings on the distributor and the timing cams for controlling the transfer.

Fig. 15 shows the transmitting rings and transmitters at the east terminal.

Fig. 16 shows the corrector rings and the timing cams.

Fig. 17 shows the relative arrangement of Figs. 2 to 16, inclusive.

Figure 1:
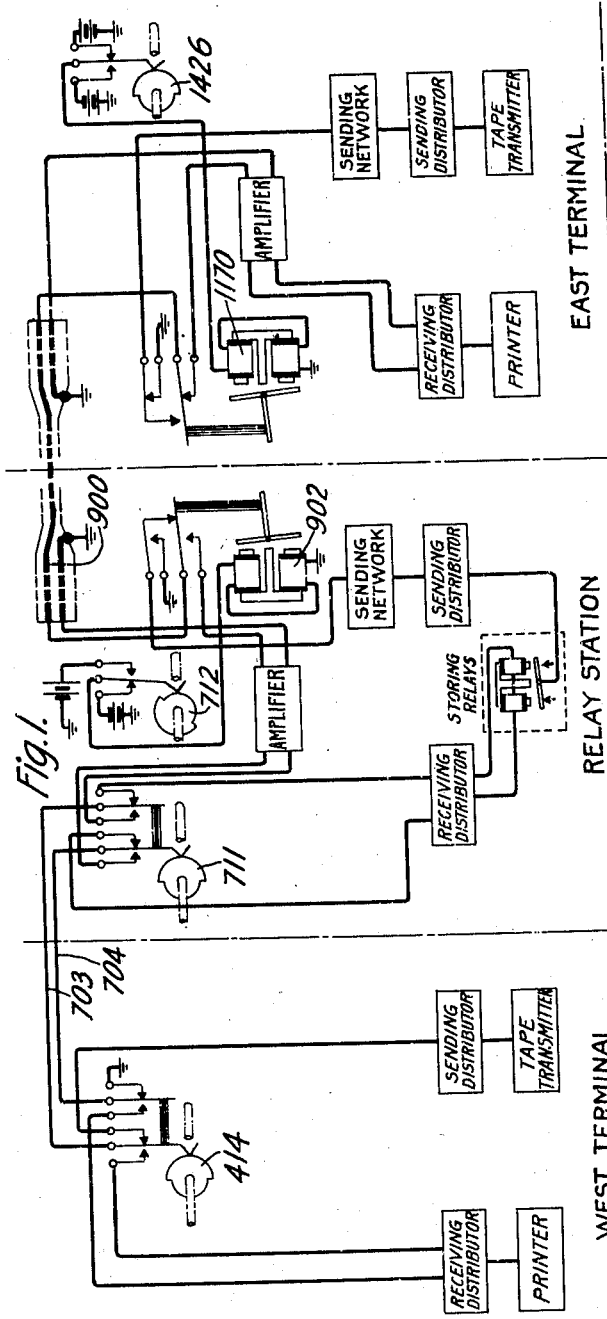
Figure 2:
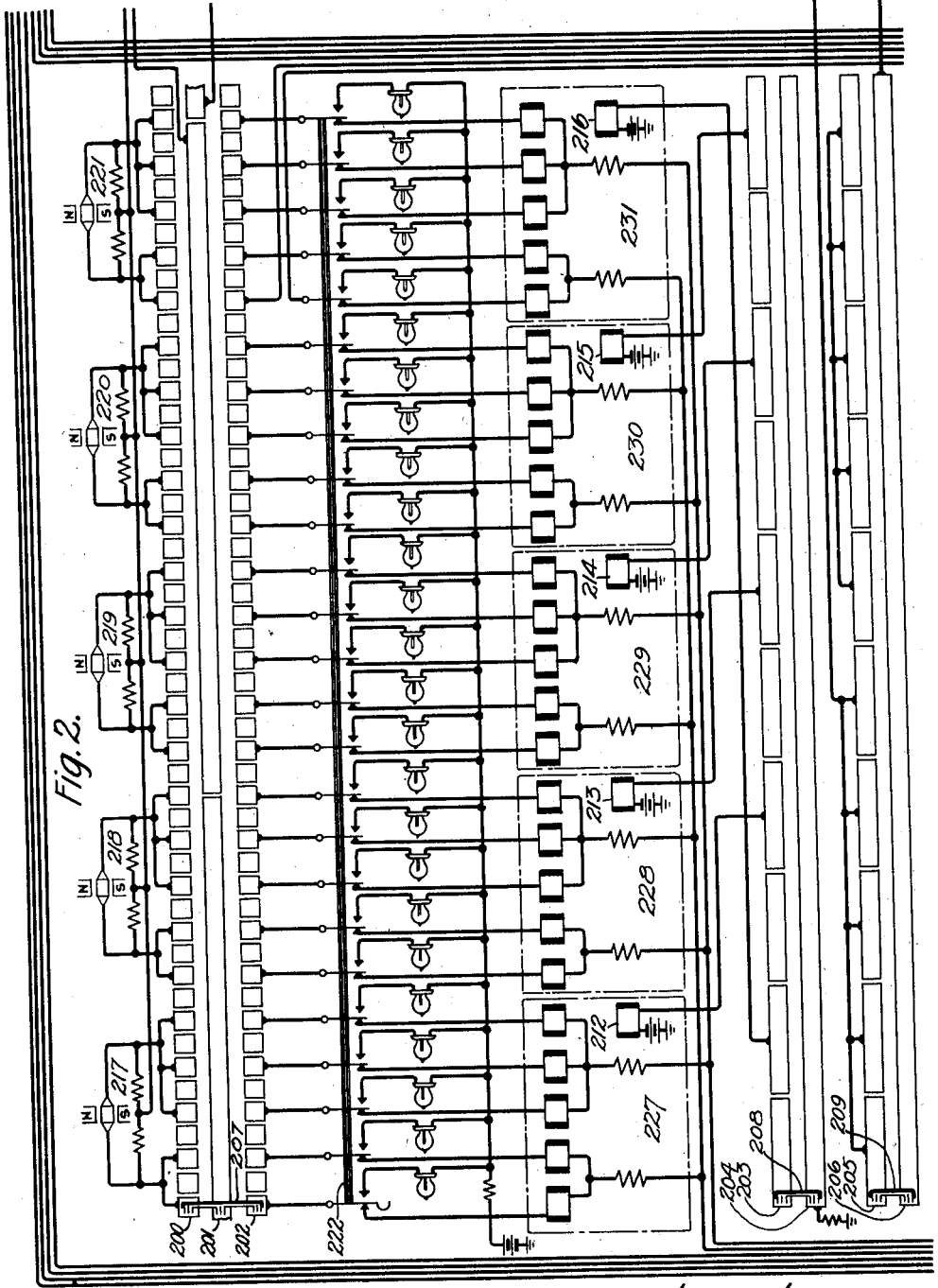
Fig. 2 shows a portion of the receiving distributor at the west terminal station, together with a diagrammatic showing of the receiving printers.

The schematic drawing of Fig. 1 sets forth the relation of the elements of the system briefly described above. At a given instant, one tape transmitter will be associated by the sending distributor with the local cable 703, 704 through contacts of transfer cam 414. At the same instant transfer cam 711 and the receiving distributor at the relay station extend the local cable to the storing relays. At a slightly later time the contact circuit of the storing relays and the associated sending battery are connected by means of the sending distributor and the contacts of relay 902 to the submarine cable 900 through the sending net work. At an instant later, measured by the time lag due to the inductance of the cable, relay 1170 will connect the cable through the amplifier and the receiving distributor to the printer corresponding to the tape transmitter above mentioned. After messages have been transmitted in this direction for a predetermined length of time, the timing apparatus at each station, which is set to measure the same time interval, will cause the cams 414, 711, 712 and 1426 to make a half revolution. In its new position cam 414 will extend the local cable to the receiving distributors and printers at the west terminal. Cam 711 will extend the output side of the amplifier at the relay station to the local cable. Cam 712 will cause relay 902 to reverse its armature and connect the submarine cable to the input side of the amplifier at the relay station. Cam 1426 will cause relay 1170 to reverse its armature and connect the cable through the sending network to the sending distributor and the transmitters at the east terminal. The path of the signals now extends from the tape transmitter at the east terminal through the sending distributor and sending network and contact of relay 1170 to the cable; from the cable at the relay station over contact of relay 902 through the amplifier and contacts of cam 711 to the local cable; and at the west terminal from the local cable over contacts of cam 414 to the receiving distributor and printers. The nature and operation of the various parts of the system will be more clearly understood from the following detailed description.

A description of the apparatus at the various stations with their relation to each other will now be given.

DESCRIPTION OF THE APPARATUS.

*Apparatus in general.*

In general, the apparatus at the terminal stations consists of five transmitters and five receivers, with two sets of commutators or distributors for directing the signals to the printers and collecting them from the transmitters. Auxiliary apparatus is provided for synchronizing the distributors and for automatically reversing the direction of transmission.

The high speed at which signals may be transmitted over these permalloy loaded cables permits the use of a number of sets of standard type printing telegraph transmitters and receivers operated multiplex. These instruments are well known in the art and have been indicated schematically at 227 to 231 and at 517 to 521. Reduced to its least terms each printer 227 to 231 consists of five magnets one for each impulse of the five pulse code employed, which, when operated in accordance with the code, select means for printing the corresponding character, and a magnet 212, 213, 214, etc., for advancing the printing surface to receive the next character and releasing the printing means. Each of the transmitters 517 to 521 similarly reduce to means such as a tape for controlling the application of the particular combination of potentials on five outgoing conductors to represent the code corresponding to the character to be transmitted, and a magnet for wiping out the setting and advancing the tape to the next character.

The distributors are of the type well known in the multiplex telegraph art, comprising a plurality of concentric rings generally arranged in pairs, one solid and one segmented, although in some cases one solid ring serves two segmented rings. A conducting brush mounted on a rotatable arm makes electrical contact between the rings of a pair. The segmented rings are in general divided into five sections or channels, one for each printer or transmitter, and each channel is further subdivided according to the functions to be performed, usually into five sub-sections, one or more for each element of the code.

At the west terminal two distributor faces are provided. Rings 200 to 206 and 300 to 301 appear on one face, which will be called the receiving distributor, and rings 500 to 506 and 600 to 603 appear in the second face, which will be called the sending distributor. Brushes 207 to 209 and 303 serve the receiving distributor, while brushes 507, 508, 509, 604 and 605 serve the sending distributor. All brushes are driven from one shaft.

In particular rings 200, 201 and 202 of the receiving face distribute the incoming signals to the printers and to leak recorders; rings 203 and 204 operate the magnets which control the printing operation; rings 205 and 206 close one part of the timing circuit; rings 300 and 301 cooperate with the relays 313, 314 and 315 to reproduce the signals. The general operation of the vibrating relays will be described later, but for a detailed discussion reference may be made to application of M. B. Kerr (Case 9), Serial No. 117,047, filed June 19, 1926.

On the transmitting distributor, rings 500, 501 and 502 transmit and record the signal impulses sent out; rings 503 and 504 operate the tape control magnets 517 etc.; rings 505 and 506 close one part of the timing circuit; rings 600 and 601 send out impulses for driving the distributor motor at the relay station; rings 602 and 603 cooperate with the corrector relays 316 and 317 to bring the distributor brushes into synchronism with those at the distant station.

The driving mechanism for both the brushes and the timing mechanism is a direct current motor (not shown). It is, of course, highly desirable that this motor rotate the brush shaft at a constant speed. In order to produce this desired constancy of speed, an alternating current is generated by the control fork 401 and transformer 404, and is applied by means of slip rings indicated at 405 to the armature winding of the motor. This current acts to hold the armature at a constant speed determined by the rate of vibration of the fork and opposes any change in rate due to change in voltage of the direct current supply. There is a tendency to change phase with this arrangement, which is overcome by the use of an impulse motor, or phonic wheel 402, driven by the control fork 401. This motor is practically without phase shift for change in voltage and hence, when in mechanical synchronism with the direct current motor, creates an opposing torque reducing the phase shift. The impulse motor is mounted directly on the drive shaft of the distributor brushes, but the direct current motor being of higher speed, is geared thereto. For a complete description of this driving arrangement reference is made to patent application of A. A. Clokey (Case 18), Serial No. 112,463, filed May 29, 1926. The driving mechanism at the east terminal is the same as above described. That at the relay station differs only in that the speed control is effected by impulses sent out directly from the distributor at the west terminal.

Figure 3:
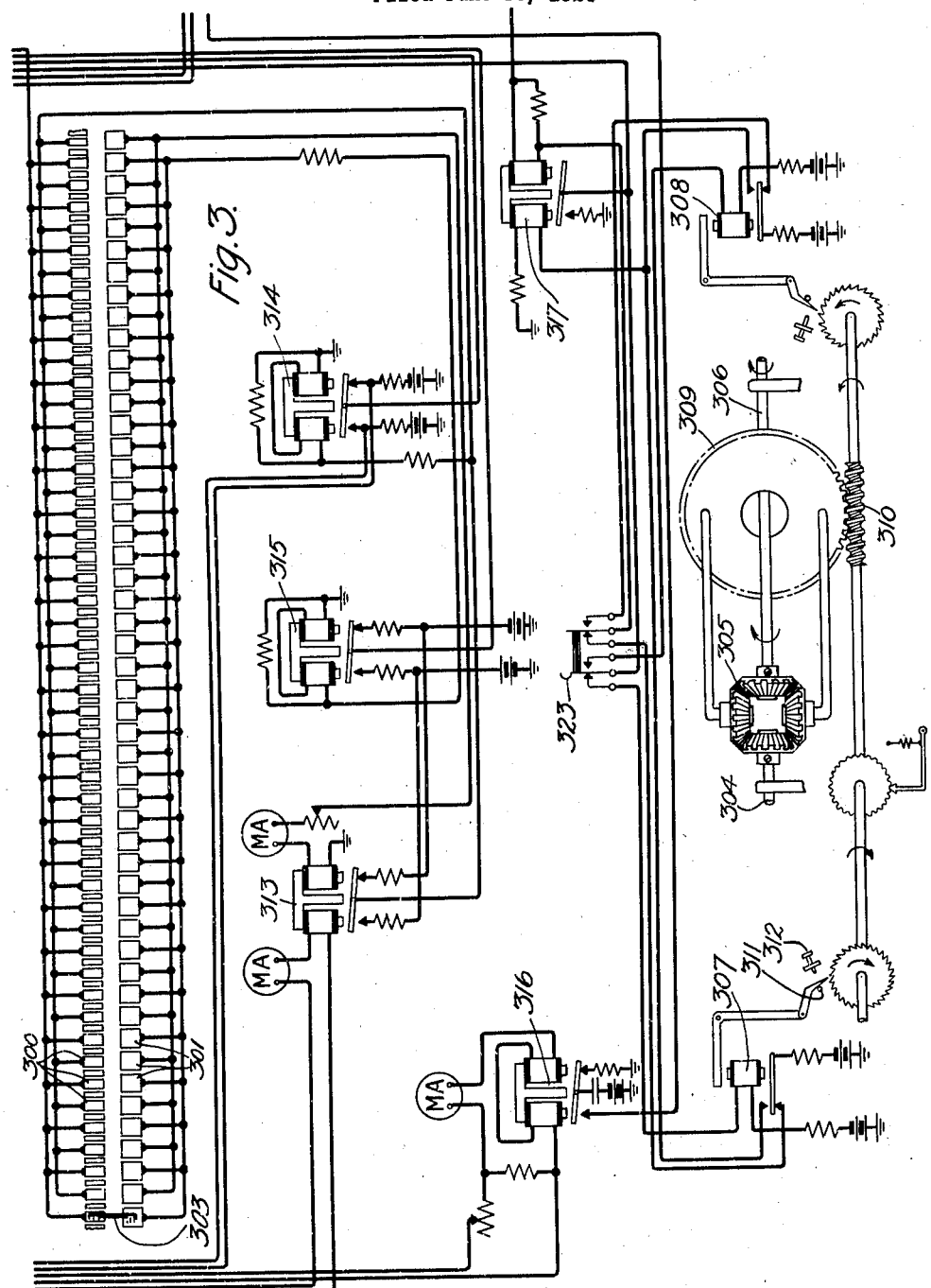
Fig. 3 shows the rings of the receiving distributor which control the vibrating relay together with a schematic showing of the correcting apparatus.
Figure 4:
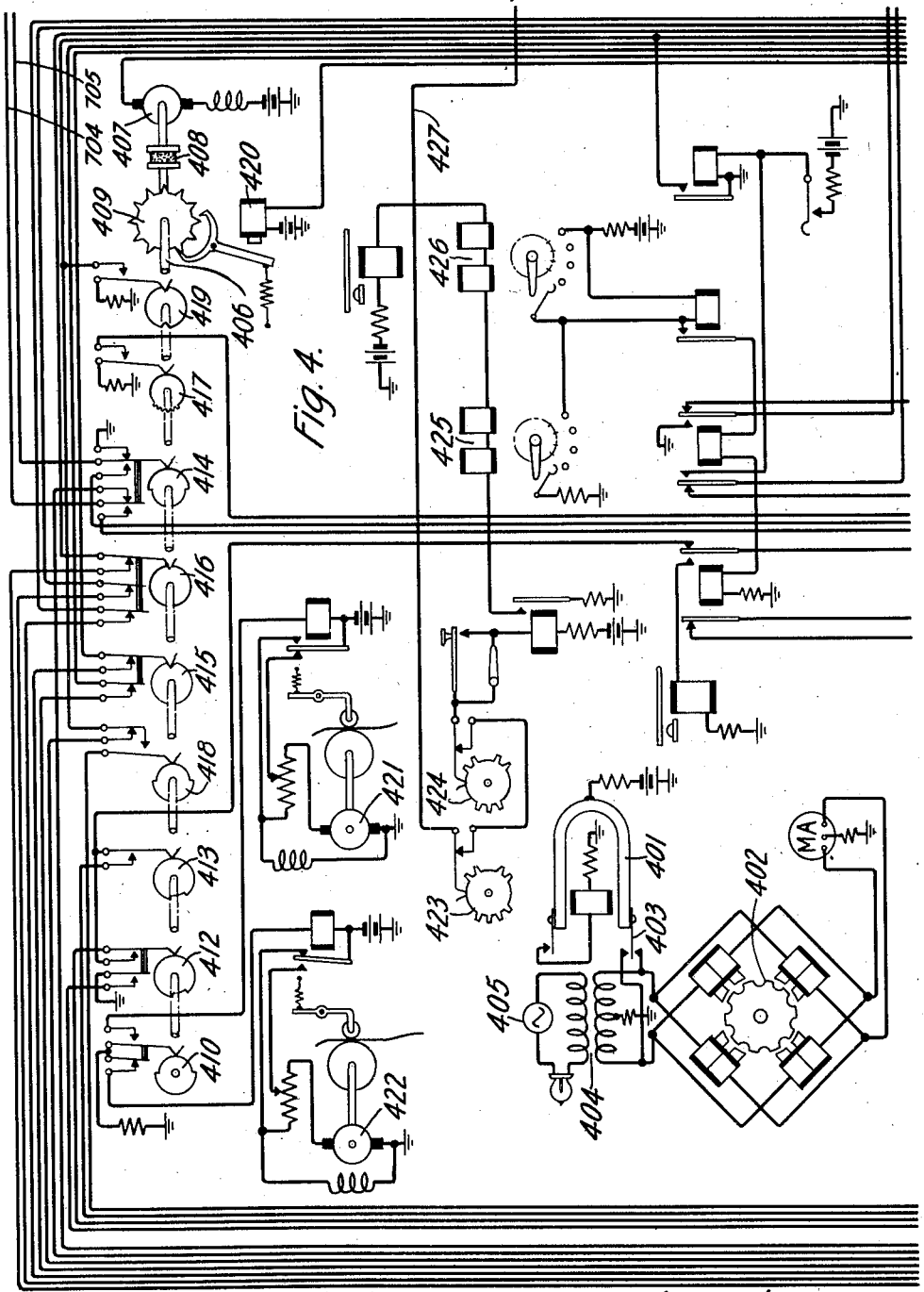
Fig. 4 shows the switching mechanism for rearranging the circuits when a change is to be made from sending to receiving and vice versa.
Figure 5:
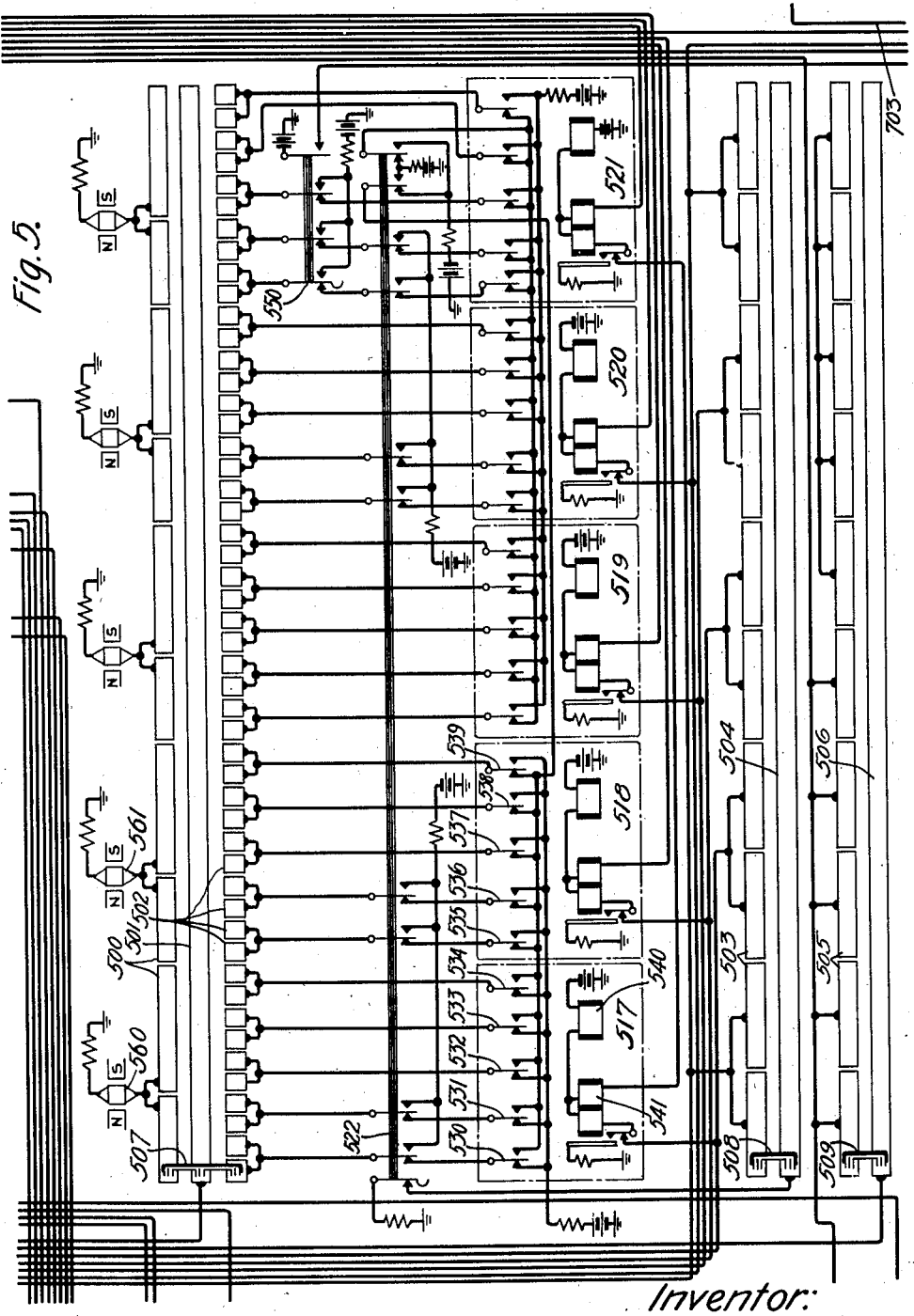
Fig. 5 shows a portion of the sending distributor together with diagrammatic transmitters.
Figure 6:
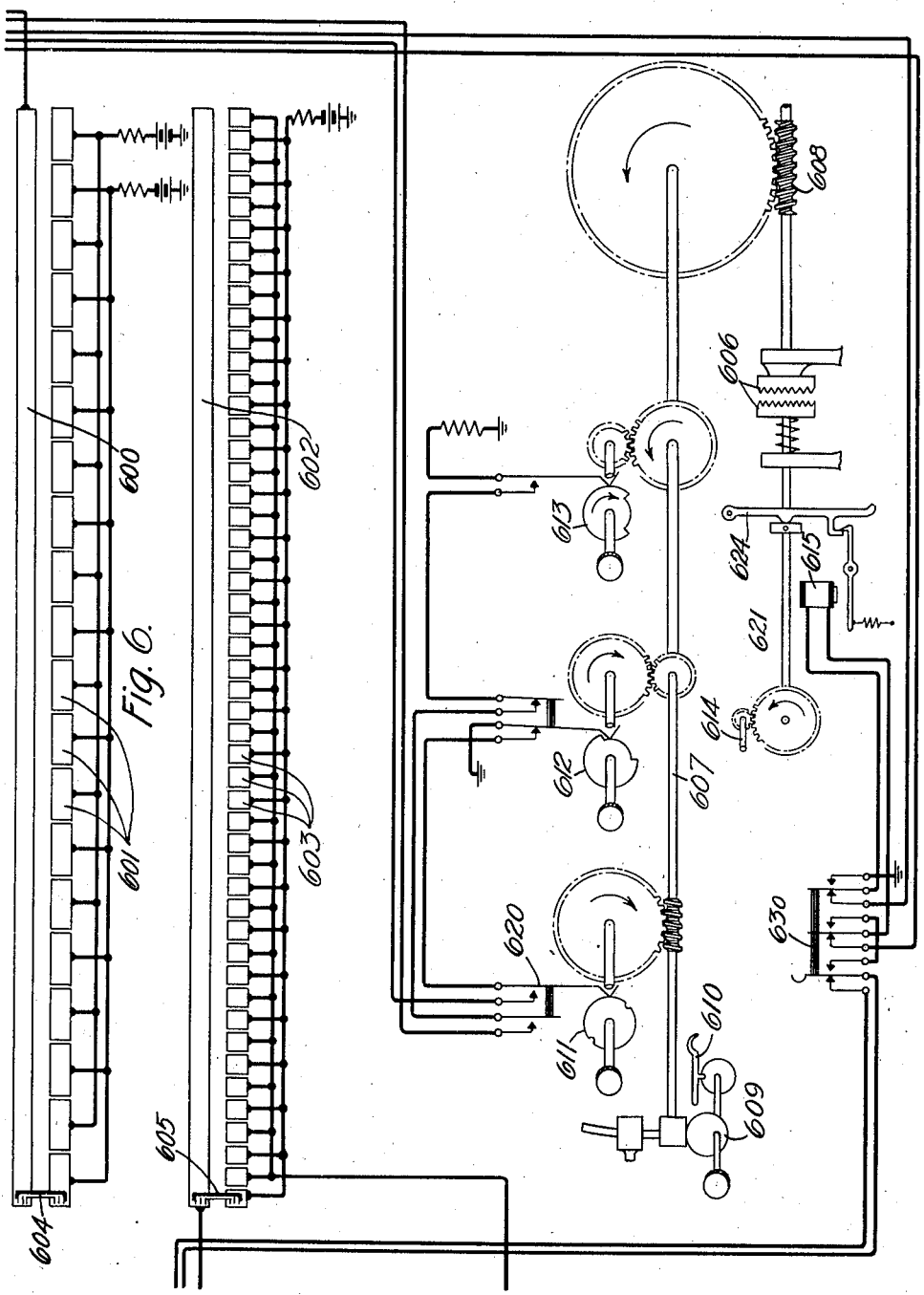
Fig. 6 shows the correcting rings and drive rings of the sending distributor. Timing cams for initiating the transfer from receiving to sending and vice versa are also shown.

Since it is very difficult to adjust two tuning forks to vibrate at exactly the same rate, the fork at one station, in this case the west station, is adjusted to vibrate at a slightly higher rate and means is provided for frequently adjusting the position of the brushes at the receiving station under the control of the sending station. The method used is that usually known as "clockhand" correction. The mechanism for making this correction is shown in Fig. 3. Shaft 304 is driven by the motor and by means of the differential bevel gears 305 drives shaft 306 which carries the brushes. The corrector magnets 307 and 308 act upon the gears 305 by means of gear 309 and worm 310. The operation of either magnet 307 or 308 rotates the worm 310 and shifts the angular position of the brush shaft 306 with respect to the motor shaft 304. The stroke of the magnet 307 is restrained by pin 311 and adjustable stop 312 for accuracy of correction. A description of the control of the corrector magnets will be given later, and a more detailed discussion will be found in Patent No. 1,670,461, granted to G. A. Locke May 22, 1928.

The reversal of direction of sending is controlled by timing cams 611, 612 and 613. These cams are geared to shaft 607 which is driven by the necessary gearing from worm 608, which, in turn is driven through clutch 606 by a shaft geared to the brush shaft 614. In order that the timing mechanism at all stations may be started at the proper time, shaft 607 may be lowered by means of cam 609, out of engagement with the driving gears of the timing cams without disengaging it from worm 608. Shaft 607 is normally locked in its operative position by lever 610. With the shaft disengaged the timing cams may be set in a predetermined position as indicated by markings on the knobs. In practice clutch 606 would then be disengaged and held there by latch under the control of magnet 615. Shaft 607 would then be restored to engagement with the timing cams and the timing operation started by an impulse operating magnet 615 and the corresponding magnets at the relay station and the east terminal station, thus starting the timing at all stations. In the present disclosure it is assumed that cam 613 makes four revolutions a minute and closes its contact for six seconds; cam 612 makes one revolution a minute and closes its contact for fifteen seconds; and cam 611 makes one revolution in 12 minutes and makes two closures of approximately twenty seconds each at six minute intervals. Cam 611 is one of a plurality of cams (not shown) rotating on the same shaft and cut to give a number of time intervals. The contact operating arm is movable to cooperate with any one of the cams and vary the time of transmission in the two directions to accommodate the traffic. Cam 611 provides for six minute transmission in each direction. For a complete description of the timing operation together with the special means for starting the timing operation reference may be made to application of G. A. Locke and H. H. Haglund (Case 8—1), Serial No. 123,861, filed July 21, 1926.

The actual transfer is brought about by transfer cams 410 to 419. These cams are mounted on shaft 406 which is driven by motor 407 through friction clutch 408. The speed of rotation of the shaft is restricted by escapement 409, controlled by magnet 420. The simultaneous closure of cams 611 and 612 completes a circuit for motor 407, and the subsequent closure of cam 613 completes a circuit for magnet 420, through distributor rings 505 and 506 or 205 and 206. As soon as magnet 420 energizes shaft 406 is permitted to move and cam 419 closes a substitute circuit for magnet 420. Each time that the distributor rotates, magnet 420 energizes and the shaft moves an annular distance measured by one half tooth on the escapement. As the shaft 406 rotates the cams 410 to 419 open and close circuits bringing about the transfer. When the shaft completes a half revolution cam 419 opens the circuit of magnet 420 and, since cam 613 has now opened its contact, the transfer switch comes to rest until the end of the next time interval. The change-over takes approximately six seconds.

Assuming the transfer switch to be in position for sending as shown at the west terminal, as soon as shaft 406 starts to move at the end of the transmitting interval, cams 415 and 416 open one winding of each of the differential relays 541 causing these relays to operate and lock the magnets 540, 541, etc., which advance the tape of the transmitters. After an interval, cam 410 slows down the motors controlling the transmitting leak record tape and speeds up those controlling the receiving leak record tape. Cam 414 transfers the signal conductors 704 and 705 from the sending distributor to the holding winding of the vibrating relay 313. Cam 417 causes a predetermined number of operations of correcting magnet 307 so that the distributor will be maintained approximately in synchronism with the distant distributor during the period occupied by the change-over, in which no synchronizing signals may be transmitted or received. Cam 418 transfers the operating circuit of relay 420 from the sending distributor ring 509 to the receiving ring 209. As the shaft 406 approaches the end of its half revolution, cam 412 connects ground to the leak recorders 217 to 221, and cams 412 and 413 extend the armature of the printer relay 314 to the two halves of ring 201. The operation of the transfer mechanism or local switch may also be initiated by the operation of a key.

The leak recorders above mentioned are siphon recorders of well known type. One is provided in series with each transmitter and one in parallel with each printer. The leak record distributor ring on the transmitting distributor is divided into ten segments, two for each channel, one covering the first two code pulse periods and the second covering the last three code pulse periods. The segments of each channel are connected together and directly to the leak recorder which is connected to ground through a resistance. In the case of the receiving distributor the ring is divided into fifty segments, ten segments to a channel half of which are unused. Due to the reversal of polarity explained hereinafter the first two and last three active segments are joined together. The first two are connected to one terminal of the siphon recorder and the last three to the other terminal. Both groups are connected to ground through a resistance. This connection rectifies the signals received and makes the leak record direct reading.

The tape on which these records are made is drawn through the recorder by means of a motor such as 421 and 422. Signals will, of course, be passing over only one distributor at a time, hence means is provided under the control of the transfer cams to slow down the motors not in use.

The west terminal is also provided with train dispatching keys 423 and 424, and train dispatching selectors 425 and 426 which enable the operators to communicate in case the multiplex equipment fails. The operation of key 423 sends out a series of impulses over conductor 427 which operates one of the train dispatching selectors at both the terminal station, selector 425, and the relay station. The operation of these selectors disconnects the distributor at the relay station from the cable and connects Morse operated relays thereto; arranges the correcting conductors 721 and 722 to control change in direction of transmission; and causes the printer relay to operate a sounder at west terminal and the synchronizing relay to operate a sounder at the relay station on signals received from the east terminal. Key 424 operates the second train dispatching selector, which restores the circuits to condition for multiplex working.

For the purpose of arranging the channels at the sending and receiving stations so that signals are received over the channel corresponding to the one transmitting, multi-contact switches 222 and 522 are provided. Switch 222 substitutes a bank of lamps for the receiving printers and these lamps are lighted in response to impulses sent out at the east terminal due to the operation of a switch similar to switch 522 which arranges for the transmission of a special code of impulses.

*Apparatus at relay station.*

The apparatus at the relay station includes a single distributor, made up of rings 800 to 802 and 1000 to 1004. The main driving force for this distributor is a direct current motor (not shown) the speed of which is held constant by the action of phonic wheel 700 and the alternating current slip rings indicated at 701 in the same manner as described for the west terminal. The drive differs from that at the west terminal in that no tuning fork is used. Instead, high speed polar relay 702 is provided and operated directly by pulses of alternate polarity from the distributor rings 600 and 601 over conductor 703 of the local cable. The segments of ring 601 transmit ten cycles of positive and negative impulses at each revolution, which is at the same frequency as the impulses from the tuning fork which control the speed of the terminal distributor. Therefore the frequency of operation of the polar relay 702 is exactly equal to the frequency of the tuning fork 401 and, since the contacts of the relay are connected to the phonic wheel 700 and the alternating current slip rings 701, the speed of the motor at the relay station is regulated to be exactly the same as that of the motor at the west station.

Distributor rings 801 and 802 direct the code impulses, received from the west station over the signal conductors 704 and 705 of the local cable, to the polar storing relays 803, 804, 805, 806 and 807. Ring 800 is provided as a means of obtaining a leak record but is not ordinarily used. The signals received over the local cable operate line relay 706, and that relay connects battery of the corresponding potential to ring 801. As brush 818 rotates over rings 801 and 802 a circuit is successively completed for the storing relays 803 to 807. These relays, operated in accordance with the signal, apply potentials to conductors 809 to 813, respectively, which terminate on segments of transmitting ring 1002. In either operated position of these relays a high resistance locking circuit is closed in order to increase the contact pressure between the contact and the tongue and improve the signals. The contacts of these relays are so connected that relays 803 and 804 apply the same potential as that received and relays 805, 806 and 807 the opposite potential to the segments of ring 1002.

For the purpose of bringing the channels at the relay station in phase with those at the terminal station, a multi-contact switch 814 is provided. With switch 814 normal, the incoming signals are directed to the storing relays; with switch 814 operated the incoming signals are directed to a bank of lamps.

Figure 7:
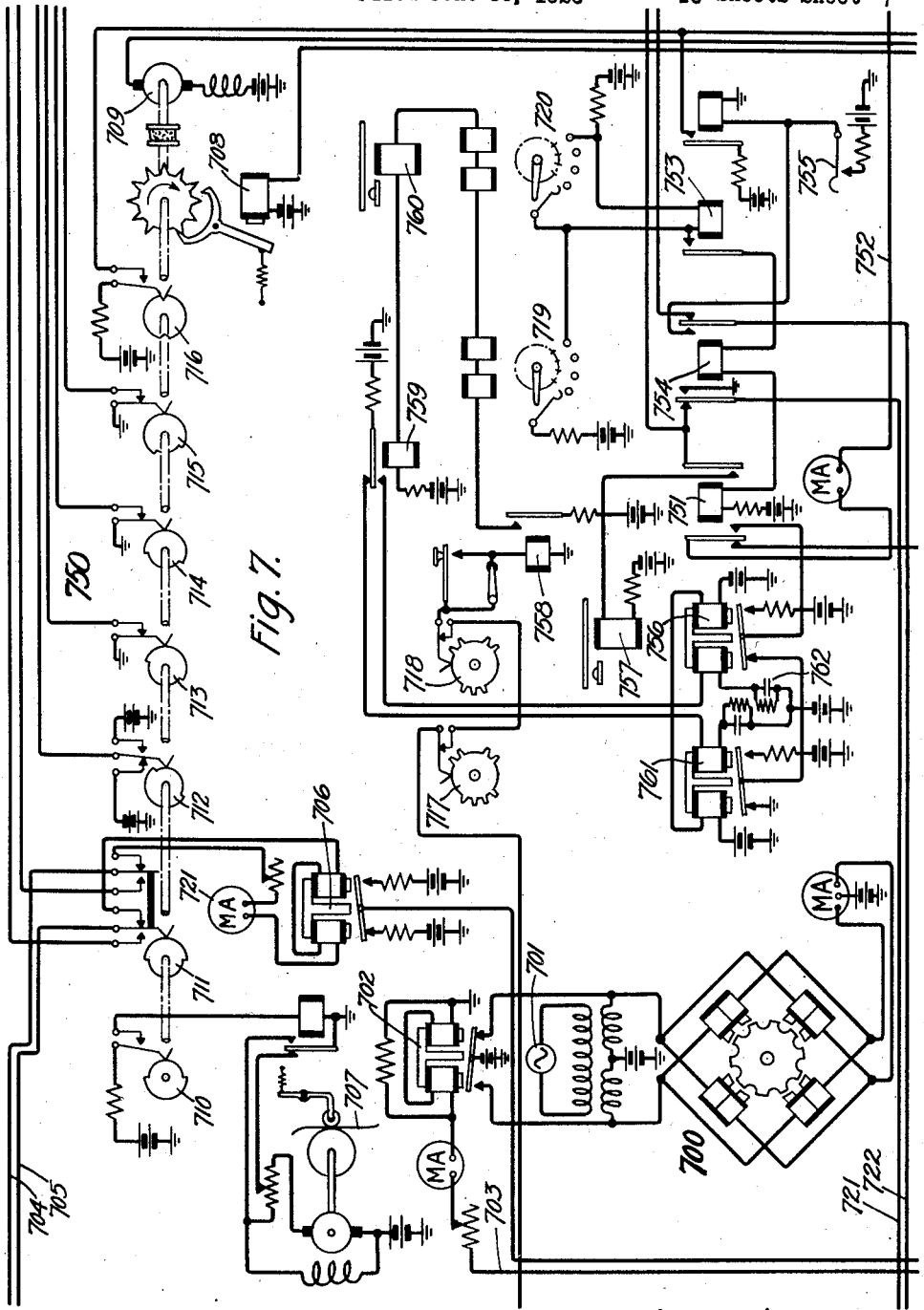
Fig. 7 shows the transfer switching mechanism at the relay station together with other equipment.
Figure 8:
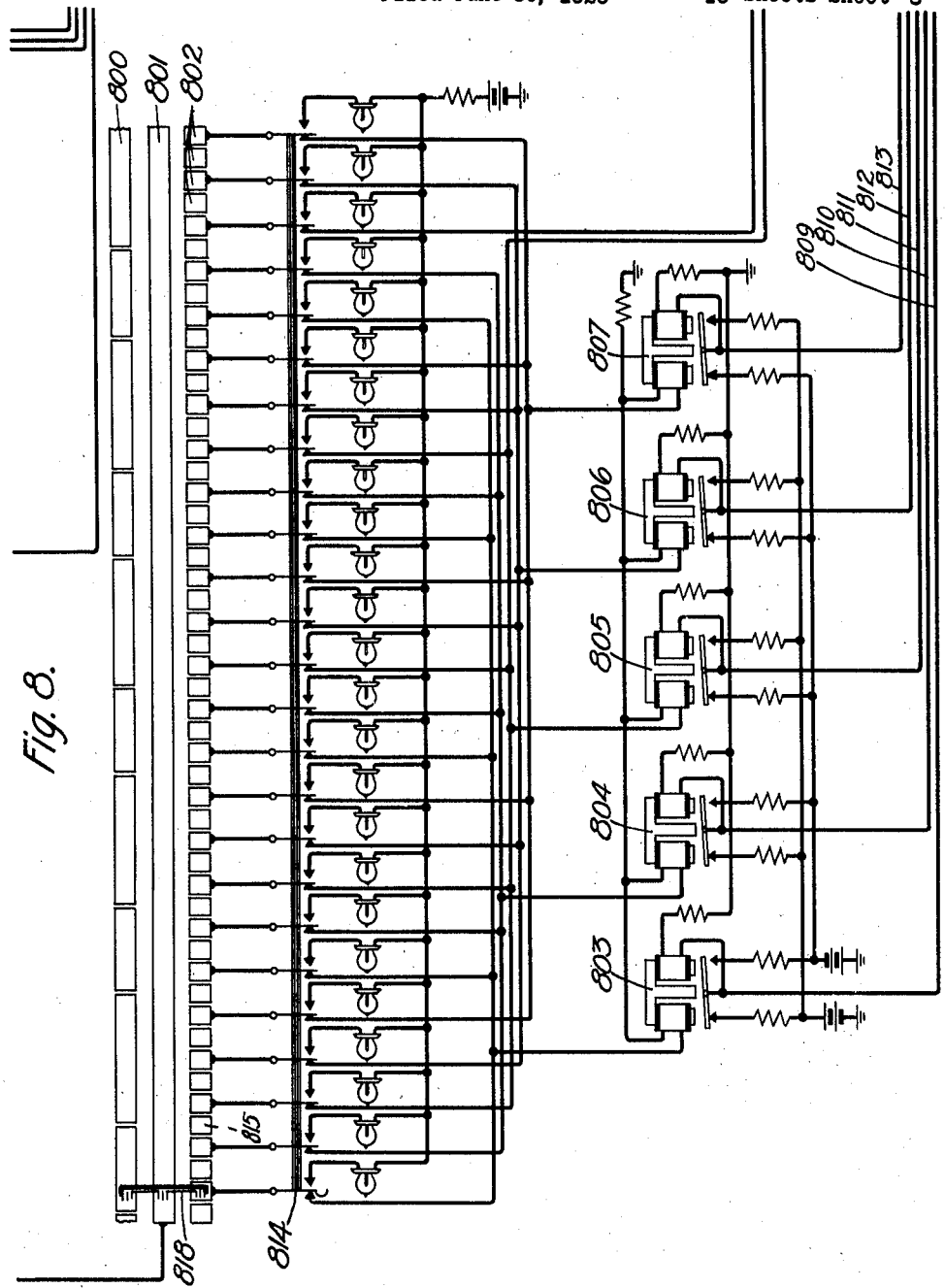
Fig. 8 shows the receiving rings on the distributor at the relay station and the storing relays.
Figure 9:
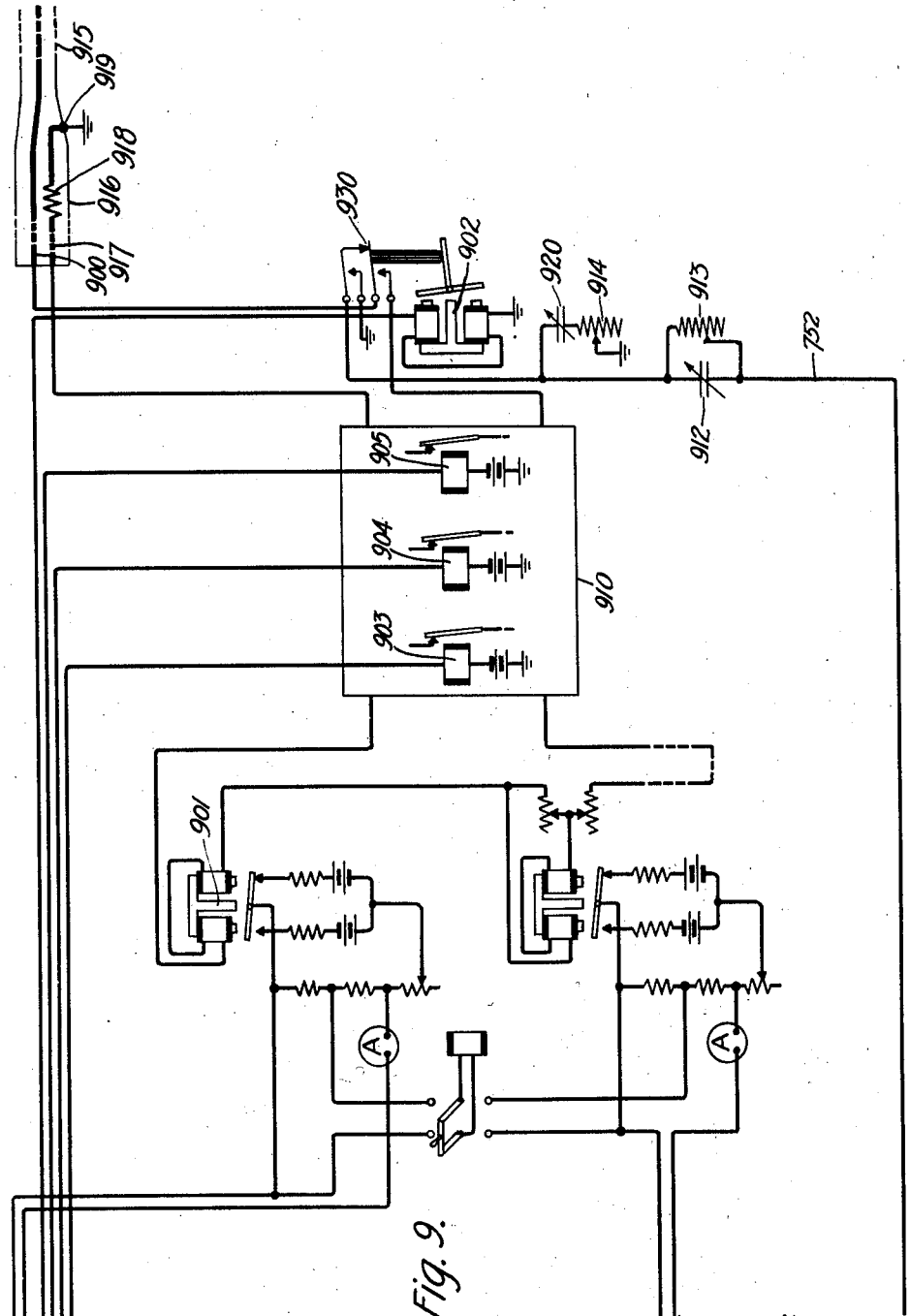
Fig. 9 shows a portion of the receiving amplifier at the relay station.

Distributor rings 1001 and 1002 are the sending rings. Ring 1001 is connected through a suitable sending network and connecting apparatus to the cable conductor 900. Thus as brush 1005 moves over rings 1001 and 1002, signal potentials are transmitted to the cable alternate with grounded intervals. To ring 1000 are connected siphon recorders 1006 to 1010, one for each channel. The manner of connecting the recorders to the segments of ring 1000 rectifies the reading. The tape of one recorder and the motor for driving it are shown at 707 in Fig. 7. Rings 1000, 1001 and 1002 are displaced with respect to rings 800, 801 and 802 so that brush 1005 encounters segment 1018 at the time brush 818 engages segment 815. This gives relay 805 time to make good contact before the signal is transmitted to the cable.

The timing cams 1011, 1012 and 1013 are geared to the distributor drive shaft 1014 in the same manner as cams 611, 612 and 613 are geared to the distributor drive shaft 614 at the west terminal. As at the west terminal they cooperate with rings 1003 and 1004 to close circuits at measured intervals for the stepping magnet 708 and motor 709 which operate the change-over cams 710 to 716. Clutch 1015 which may be locked in its disengaged position by latch 1016 and released by magnet 1017 under an impulse from the west terminal permits starting the timing operation simultaneously at the two stations.

Change-over cam 710 slows the leak record motors as does cam 410. Cam 711 transfers the conductors 704 and 705 incoming from the west terminal from the winding of line relay 706 to the contacts of signal relay 901. Cam 712 operates polar relay 902 which connects the cable conductor 900 to the amplifier while receiving or to distributor ring 1001 while sending. Cams 713, 714 and 715 control relays 905, 904 and 903 respectively, which in turn control shunts in the amplifier. Cam 716 provides a holding circuit for magnet 708 as cam 419 does for magnet 420.

The train dispatching keys 717 and 718 and selectors 719 and 720 may be used to transfer from multiplex to manual transmission when necessary. The amplifier at the relay station has been shown in skeleton since it is a duplicate of that at the east terminal which will be described later.

When train dispatching selector 719 is operated it completes a circuit for relay 753 which in turn closes circuits for relays 754 and 751. Relay 754 arranges the correcting conductors 721 and 722 of the local cable to place the control of the local switches at both the west terminal and the relay station under a key such as key 755. Relay 751 connects the cable input conductor 752 to the contact of Morse sending relays and the armature of the corrector relay to sounder 757.

When Morse signals come in from the west terminal, relay 758 is operated in accordance with the Morse code, in turn operating relay 759 and sounder 760. Relay 759 controls relay 756 and 761 to retransmit the message over the cable. A circuit through the right winding of relay 756 and the left winding of relay 761 causes these relays to normally close their left contacts. When relay 759 closes its front contact it completes a circuit from positive battery through the left winding of relay 756 and condenser 762 to negative battery. Condenser 762 is charged and relay 756 operated momentarily by the charging current. A high resistance shunt permits the condenser to discharge during periods when it is not connected to battery. A similar circuit over the back contact of relay 759 through the right winding of relay 761 operates that relay at each release of relay 759. Each operation of relay 756 applies positive battery to the cable; each operation of relay 761 applies negative battery to the cable and during the interval between the release of relay 756 and the operation of relay 761 ground is connected thereto. The Morse signals are therefore translated into a code proper for transmission over the cable.

*Apparatus at the east terminal.*

The apparatus at the east terminal differs from that at the west terminal chiefly in that the amplifier is located at the terminal. Also the distributor rings are arranged somewhat differently since the use of this station to relay messages over a second cable is in contemplation. Distributor rings 1200, 1201, 1202, 1203, 1204, 1205, 1206, 1300 and 1301, appear on one distributor face and correspond in function and arrangement to rings 200, 201, 202, 203, 204, 205, 206, 300 and 301 at the west terminal. Rings 1500, 1501, 1502, 1503, 1504, 1505 and 1506 appear on a second distributor face and correspond in function and arrangement to rings 500, 501, 502, 503, 504, 505 and 506 at the west terminal. Rings 1602 and 1603 correspond in function to rings 602 and 603 but appear on a third distributor face known as the correcting distributor and are adjustable in order to maintain synchronism when changing from transmitting to receiving. The driving, correcting and timing means are also the same at the two stations. Since the east terminal is located at the cable landing, the transfer cams correspond in function to a part of those at the west terminal and a part of those at the relay station. They are shown in the receiving position while those at the other stations are shown in the transmitting position. Cams 1410, 1412, 1413, 1415, 1416, 1418 and 1419 correspond in function to cams 410, 412, 413, 415, 416, 418 and 419, respectively, at the west terminal. Cams 1423, 1424, 1425 and 1426 correspond to cams 715, 714, 713 and 712, respectively, at the relay station.

The equipment which has heretofore been referred to as the amplifier, includes a four-stage amplifier 1100, which differs from that disclosed in Patent No. 1,624,396, granted to A. M. Curtis on April 12, 1927, only in the use of a slightly different receiving network and in the addition of the means for connecting the amplifier in or out of circuit in steps which forms the subject matter of a later application of A. M. Curtis (Case 33), Serial No. 119,536, filed June 30, 1926. The output of the amplifier is connected to relays 1101, 1102 and 1103, recorder 1104 ammeter 1105, thermocouple galvanometer 1106, and oscillograph 1108. Relays 1101, 1102 and 1103 and recorder 1104 are connected to the output circuit by means of an adjustable series and shunt resistance arrangement whereby the current through one relay may be adjusted without changing the total current through the circuit and thereby through the other relays or the recorder. Relay 1101 is a two position relay and controls the corrector mechanism. Relay 1102 is the signal relay and has three positions, the armature disengaging both contacts when insufficient current is received. Relay 1103 is also a three position relay, and corrects for "zero wander". This relay is so adjusted, however, as not to close either contact as long as zero bias remains within certain limits. All three relays are of the type disclosed in application of A. M. Curtis (Case 34), Serial No. 124,595, filed July 24, 1926.

The apparatus for correcting for "zero wander", including relay 1103, variable condensers 1109 and 1110, and loud speaker 1111, operates in essentially the same manner as the equipment disclosed in application of A. M. Curtis (Case 27), Serial No. 106,355, filed May 3, 1926.

Cable.

The submarine cable employed in the present system to connect the relay station with the east terminal comprises a single core section 915 terminated in a twin core section 916. One core 900 of section 916 is connected at one end to the single core of section 915 and at the other end may be connected by relay 902 to the receiving amplifier 910 or to the transmitting condenser 912. The other core 917 of the twin core section is connected at the sea end through a resistance 918 to the cable armor wires at point 919, the conventional ground connection indicating that the armor wires are grounded. Core 917 and grounded resistance 918 constitute a cable balancing return circuit. The cable has a characteristic impedance for the higher frequencies involved in signaling of approximately 400 ohms and this impedance is substantially a pure resistance.

TRANSMISSION DETAILS.

Transmitting.

The signal code employed in submarine telegraphy is made up of impulses of positive and negative polarity and five such impulses are combined in various ways to make up the characters. On sending pulses out over the cable, it has been found that, if the outgoing signal pulses are "curbed", by earthing the cable for a short time between each pulse, the received signals are much less distorted. This is accomplished in practice by dividing the segment of the transmitting ring, over which the pulse is to be transmitted, into halves, and supplying the pulse over one half and ground over the other. Rings 1002 and 1502 are cut in this manner. The ground for this purpose is obtained by a ground connection made several miles at sea, to reduce the chances of interference due to local earth currents.

Not only are the signals "curbed" by the distributor segments in this manner, but the outgoing signals are transmitted through a sending network before passing to the cable. The sending network takes the form of a condenser 912, shunted by a variable resistance 913 together with an impedance 914 in series with condenser 920 connected between the cable terminal and ground. Impedance 914 has a low value as compared with the characteristic impedance of the cable while the capacity of condenser 920 is so large that it has little influence on the action of impedance 914 at any but the extremely low frequency components of the signal. This sending network is discussed in detail in Patent No. 1,624,396, granted to A. M. Curtis on April 12, 1927, filed September 17, 1925. Its function is to make the outgoing signals sharp and short and also to eliminate as far as possible parasitic earth currents.

The permalloy loading of the cable produces a two-fold effect, it increases the ratio of the potential of the received signals to that of the transmitted signals over that obtainable without loading, and increases the time for a signal to traverse the cable. The first effect permits much higher speed of transmission and the second effect is compensated for by the relative adjustment of the sending and receiving brushes.

The speed at which the current impulses are sent out is determined by the speed at which the distributor brushes are driven. Where impulses of opposite polarity follow one another, the current will reverse each time the sending brushes pass from one transmitting segment to the next. The speed at which these reversals take place is called the signaling frequency and the maximum frequency which may be detected at the receiving station is determined by the attenuation constants of the cable. Where two impulses of the same polarity are transmitted, one long impulse will be received with a possible slight reduction of amplitude corresponding to the earthed interval.

Reception.

The signals as received are exceedingly weak and are also distorted, taking the form of undulating rounded waves unsuitable to operate automatic printers. In addition, where impulses of one polarity preponderate, the received current of that polarity will grow larger and larger while those of the opposite polarity will appear as slight ripples on the preponderating current, giving the effect known as "zero wander". The receiving equipment should therefore include means for amplifying and shaping the incoming signals and for correcting the bias or "zero wander". These means have been disclosed in detail in Fig. 11. The twin core section 1122 of the cable at the east terminal is connected to the receiving equipment through a network 1121. This termination consists of a shielded transformer 1123, the secondary winding of which is connected to the input circuit of amplifier 1100. The primary winding is connected to coupling resistance 1124 and resistance 1129 by means of auto-transformer 1125. Connected in series with core 1126 is condenser 1127 shunted by a variable resistance 1128, as well as a series anti-resonant circuit 1180. These networks control the amplitude and phase of the lower frequency components of the signaling current and are of high impedance as compared with that of the cable and return circuit. For suitable values of the various elements as well as elements of the amplifier, reference is made to Curtis Patent No. 1,624,396, above referred to.

Amplification.

Amplifier 1100 comprises four stages of electron discharge amplifiers with suitable coupling circuits and signal shaping networks. The first stage amplifier 1130 is provided with a negative grid battery 1131 of three volts. The filaments of all the amplifiers are grounded and heated in a suitable manner. The output circuit of amplifier 1130 is coupled to shaping network 1132 by resistance 1133 and condenser 1115. The space current supply battery 1134 of 250 volts is in series with resistance 1133. The shaping network 1132 consists of a primary variable condenser 1135, a secondary variable condenser 1136, adjustable resistance 1137 and variable inductance 1138. The values of the elements of this network are so chosen that the higher frequencies are increased in voltage relative to the lower frequencies thus compensating in part for the cable attenuation.

The upper terminal of coil 1138 is connected to the grid of amplifier 1140 which is maintained negative by battery 1141. The output of amplifier 1140 is coupled to network 1142 by means of resistance 1143, and condenser 1144. Shaping network 1142 consists of inductance 1145 shunted by resistance 1146 connected in series with condenser 1147. The input circuit of amplifier 1150 is connected across the variable portion of potentiometer 1148, the fixed portion of which, in series with grid polarizing battery 1151, is connected in shunt of condenser 1147.

Amplifier 1150 is coupled to network 1152 by means of resistance 1153 and condenser 1154. Network 1152 is similar to network 1142 although the values are not the same in all cases.

Amplifier 1160 consists preferably of two vacuum tubes in parallel, but for simplicity only one is shown. The output circuit of amplifier 1160 is connected to the relays 1101, 1102 and 1103.

The interstage networks are adjustable to discriminate against interfering high frequency components, and to improve the shape of the received signals.

Figure 11:
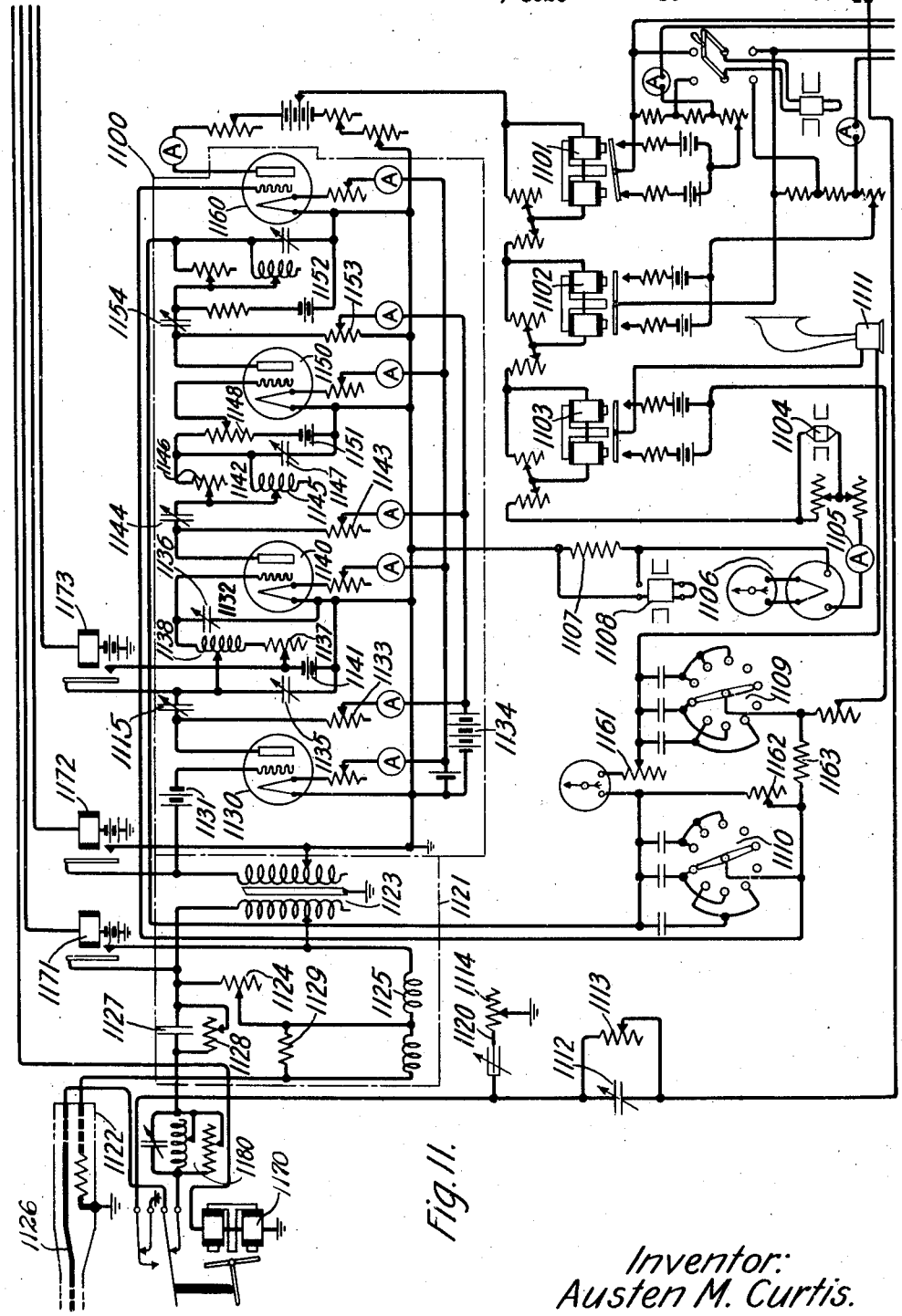
Fig. 11 shows the amplifier, signaling relay, synchronizing relay, etc., at the east station.
Figure 12:
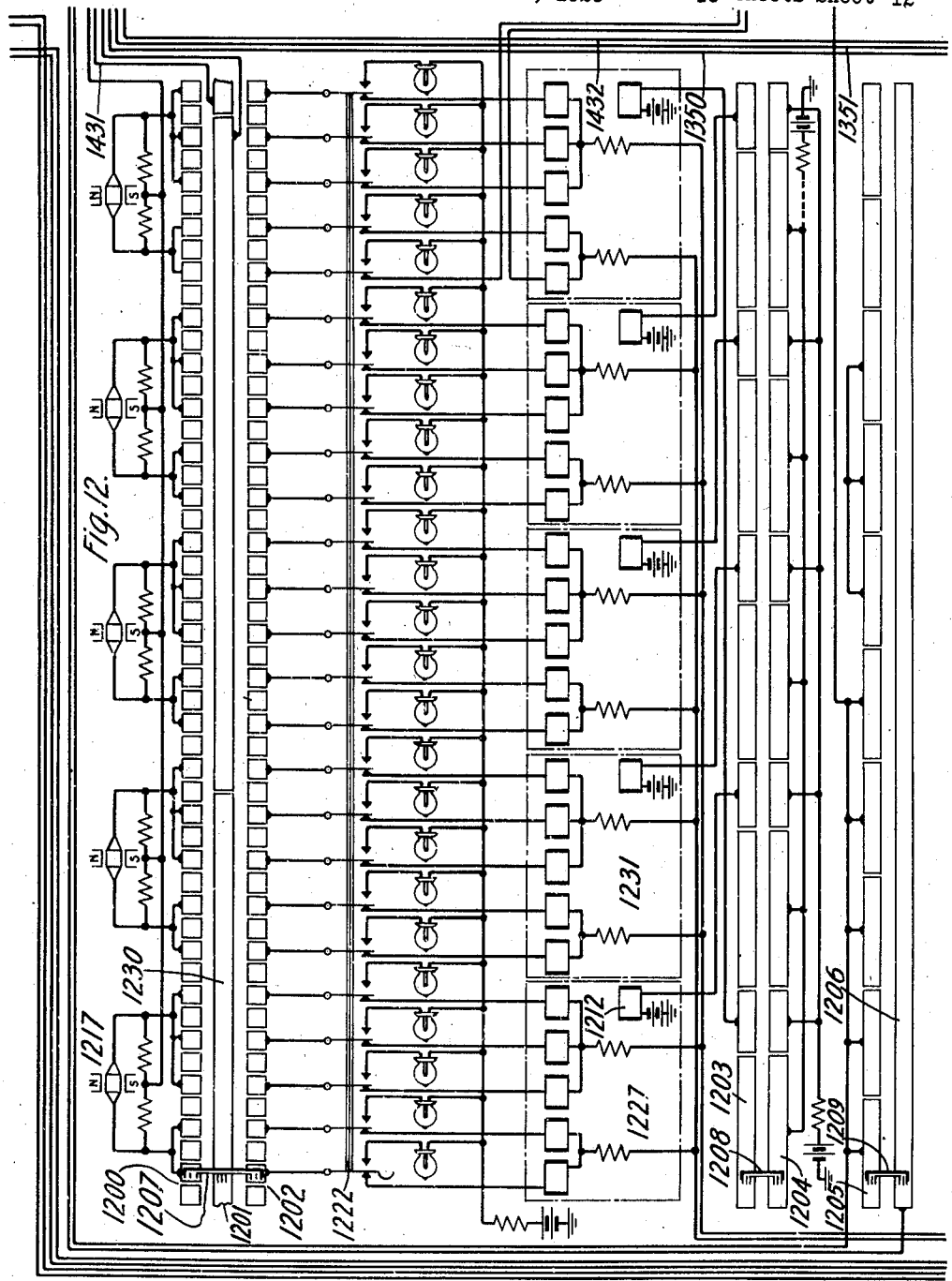
Fig. 12 shows a portion of the distributor at the east terminal station with the printers indicated schematically.
Figure 13:
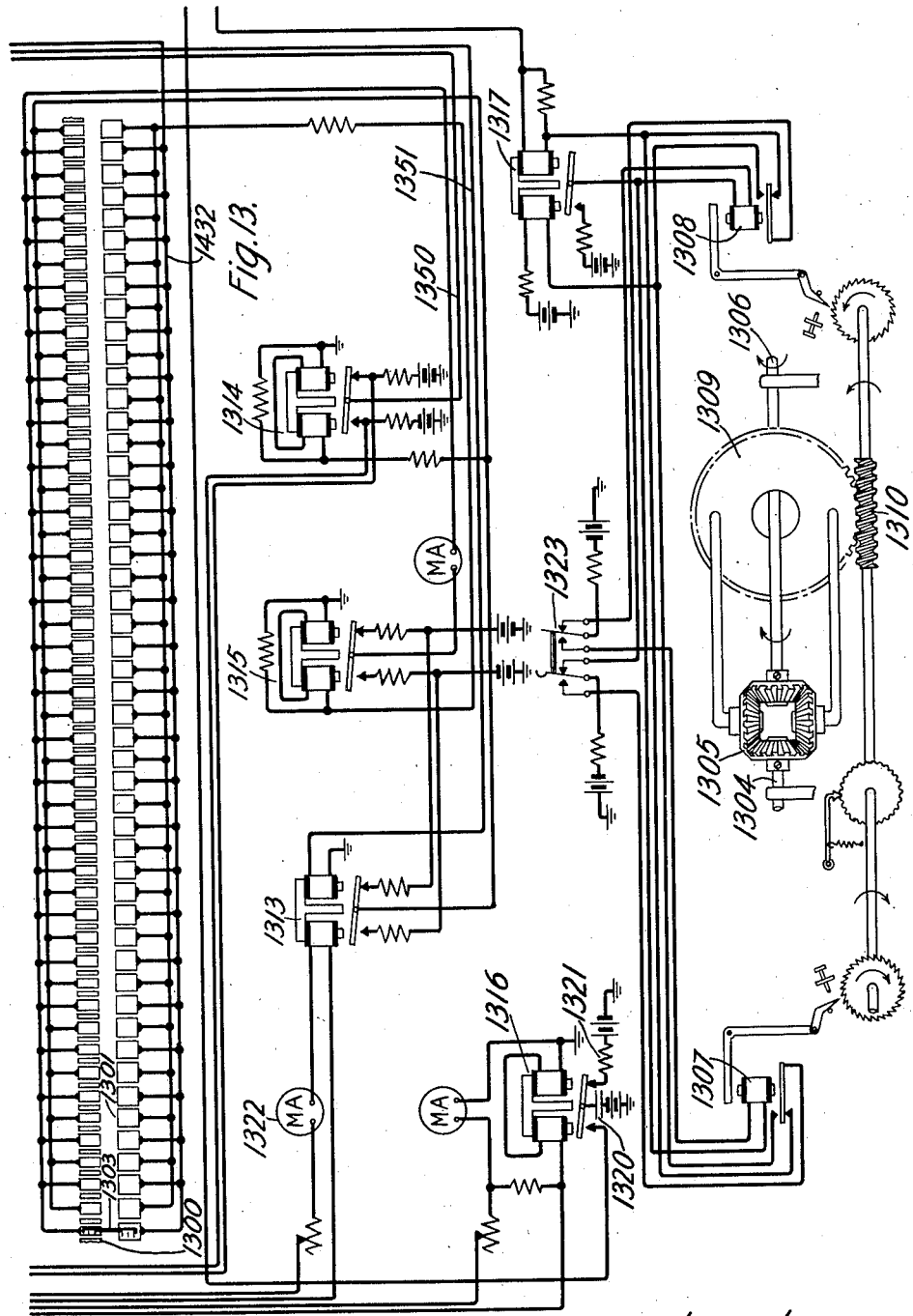
Fig. 13 shows the vibrating rings and correcting mechanism at the east terminal station.
Figure 14:
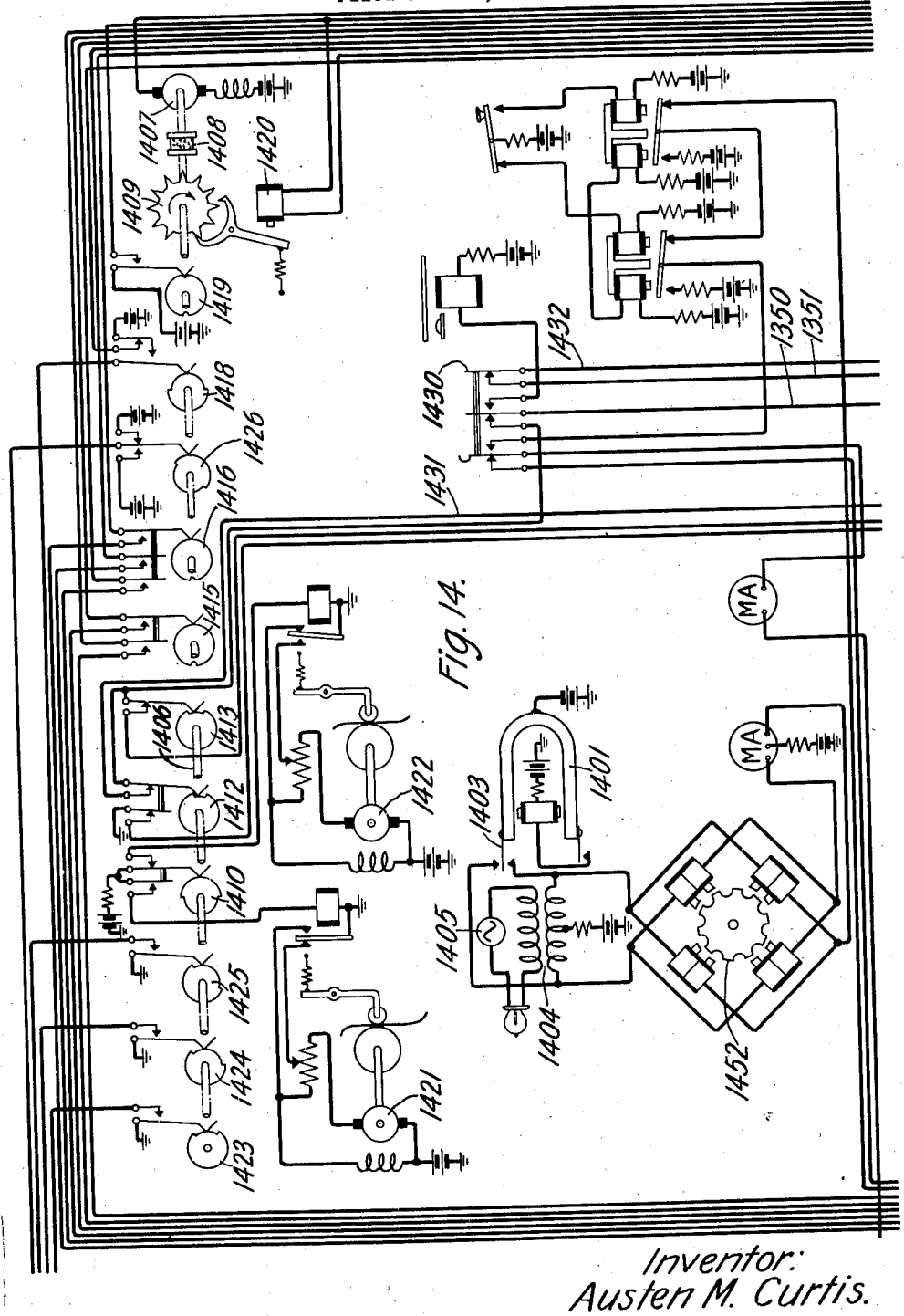
Fig. 14 shows the transfer switching mechanism and Morse equipment at the east terminal.

When switching from sending to receiving the amplifier is subject to heavy surges of current which may even block the signals for a time. To obviate these surges the transfer mechanism is arranged to connect the amplifier into and out of circuit with the cable core in steps. The cable 1126 is connected to the receiving network by polarized relay 1170. Across the primary winding of the transformer, across the secondary winding of the transformer and between amplifiers 1130 and 1140 are shunts controlled by relays 1171, 1172 and 1173, respectively. Relays 1170 to 1173 are controlled by transfer cams 1423, 1424, 1425 and 1426. From an inspection of these cams it will be seen that when receiving as shown in Figs. 11 and 14, relays 1171, 1172 and 1173 are deenergized while polarized relay 1170 is operated to connect the cable to the amplifier. When shaft 1406 is rotated to transfer to transmitting, the relays 1173, 1172, 1171 and 1170 will be operated in order in rapid succession. When transferring back to receiving, relay 1170 will first be operated to the receiving position and then the shunts closed by relay 1171, 1172 and 1173 will be opened at measured intervals, allowing the surge currents to dissipate themselves through the later opened shunts as each one is opened.

Zero wander correction.

To reduce the likelihood of a preponderance of signals of one polarity, particularly when no signals are being transmitted, the polarity of the marking and spacing impulses is reversed between the second and third impulses of each channel. At the relay station this is accomplished by reversing the polarities of the batteries connected to the contacts of the storing relays. At the east terminal it is accomplished by reversing the polarities at the transmitter contacts. In spite of this precaution the "zero wander" above mentioned, is likely to occur. In order to permit the grid potential of the amplifier 1160 to be automatically adjusted in such a manner as to restore the signals to the proper limits for operating the printing equipment, a variable condenser 1110 is inserted between networks 1152 and the grid of amplifier 1160. This is of such a size that it has no effect on the normal high frequency signals. A second variable condenser 1109 is coupled to condenser 1110 by resistance 1161, whose maximum resistance is approximately two megohms, and 1163 whose value is 200,000 ohms. Resistance 1162 which has a maximum value in the neighborhood of one megohm is connected in parallel with the grid condenser 1110 to permit it to discharge slowly after a correcting charge has been applied.

Assume that a preponderance of positive signals has had its usual effect of causing the zero of the signals to be depressed to the negative side of its normal position, i. e., the average potential of the grid of amplifier 1160 is more than normally negative. The armature contact of relay 1103 will then make momentary contact at the peak of each negative signal, with one of its side contacts. This will complete a circuit from the center point of the split battery through the resistances and condenser 1109 and back through the loud speaker 1111 to the relay armature. A certain charge will thus be applied to condenser 1109, and the voltage to which it is charged will depend upon the voltage of the charging battery, the size of the resistances and the capacity of the condenser. This charge will commence to flow to condenser 1110 through the resistances 1161 and 1163, and at the same time to leak off slowly through shunt resistance 1162. A potential will thus gradually appear on condenser 1110 (and also on the grid of amplifier 1160) and will soon build up to a value at which it restores the average negative potential of the grid to its normal value. It should be noted that the windings of relay 1103 and the batteries connected to its contacts are poled so that the direction of its effect is to restore the grid potential to normal. As soon as this effect commences to occur the duration of the engagement of the relay contacts lessens and reduces the correcting potential until, when the average grid potential is again normal, the relay ceases to make contact. The loud speaker 1111 forms at once the means of indicating the adjustment of relay 1103 and for indicating any abnormal bias in the signals since each closure of the circuit produces a click in the speaker.

*Synchronous vibrating relay operation.*

Signaling may be carried on at a speed greater than the maximum at which the cable will transmit reversals of unit length by the use of a synchronous vibrating relay 1313. This arrangement is described in detail in application of M. B. Kerr (Case 9), Serial No. 117,047, filed June 19, 1926. The purpose of this relay is to reinsert in the received signals the unit length current impulses that have been lost due to the high speed at which transmission takes place. Transmission may take place at a speed which renders pulses constituting two pulses of unit length and of the same polarity just strong enough to operate the line relay 1102. Cooperating with relay 1313 are auxiliary vibrating relay 1315, printer relay 1314 and distributor rings 1300 and 1301, which are joined by brush 1303.

Pulses of unit length are attenuated until they fail to operate relay 1102, which normally closes neither contact; pulses made up of two or more pulses of the same polarity will cause relay 1102 to close the corresponding contact. The armatures of relays 1313, 1314, and 1315 remain in either closed position until reversed by current of opposite polarity. When no signals are being received, or relay 1102 is not operated, due to the reception of positive or negative impulses of unit length, the auxiliary vibrating relay 1315 is operated through rings 1300 and 1301 from contacts of relay 1313 closing a circuit for vibrating relay 1313 through the winding, called the vibrating winding, over alternate segments of rings 1300 and 1301 to a contact of relay 1315, which causes relay 1313 to close its opposite contact. A circuit will be closed over the next segments of rings 1300 and 1301 to reverse the armature of relay 1315, and over the following segments to reverse the armature of relay 1313. Relay 1314 operates directly from the contacts of relay 1313 and applies potentials to ring 1201 for distribution to the printers 1227, etc. When no signals are being received, relays 1313 and 1315 will therefore vibrate between their contacts and will cause printer relay 1314 to operate the printer magnets as though alternate positive and negative pulses of unit length were being received.

The circuit through the second or "holding" winding of relay 1313 is completed at the contacts of signal relay 1102. The strengths of the currents through the holding and vibrating windings of relay 1313 are adjusted so that relay 1313 will follow the operations of the amplifier signal relay irrespective of the polarity of the current which may be received in the vibrating winding. Thus when an impulse of two or more units in length causes the operation of relay 1102, relay 1313 will be operated in the corresponding manner and auxiliary vibrating relay 1315 will also remain operated in one direction. If this impulse is followed by one or more unit length impulses, no current will be received in the holding winding of relay 1313 and that relay will reverse its armature on the next closure of the circuit through its vibrating winding, which will occur in synchronism with the incoming pulses. Printer relay 1314 will therefore operate to record a unit length pulse of opposite polarity. A second unit length pulse will again result in no current in the holding winding of relay 1313 and the reversal of its armature and the printing of a unit length pulse of the same polarity as the long pulse. It may be noted that the active segments of ring 1300 are separated by narrow dead segments which prevent short circuiting the armatures of relays 1313 and 1315.

*Synchronization.*

Corrector relay 1101, as heretofore stated, remains in either operated position. It reverses the position of its armature with each reversal of the incoming signals. These reversals of polarity occur at the beginning of a signal and therefore occur, when the distributor is in synchronism, as the brushes encounter the first distributor segment over which the signal is to be received. The operations of relay 1101 cause corresponding operations of relay 1316 which in turn controls a circuit over rings 1602 and 1603. Ring 1602 is solid, but ring 1603 is divided into 50 segments, two for each impulse. The first segments of these pairs are strapped together and connected to battery through resistance 1616. The second segments are strapped together and connected to the winding of auxiliary corrector relay 1317.

When relay 1316 closes its right hand contact, condenser 1320 is charged through resistance 1321. When relay 1316 closes its left hand contact, condenser 1320 is discharged through distributor rings 1602 and 1603 and thence through resistance 1616 or the winding of relay 1317. With the distributors at the west and east terminals running in exact relative synchronism, taking into account the cable lag, brush 1605 will make contact with the first segment of a signal pair at the time relay 1316 closes its left hand contact and condenser 1320 will discharge through resistance 1616.

As was stated heretofore, in practice the distributor at the west terminal is adjusted to run faster than that at the east terminal. The brushes, such as brush 1605, will therefore lag behind the incoming signals, so that brush 1605, will, after an interval, be still in contact with a second segment when relay 1316 operates due to an incoming signal. A circuit will then be closed through relay 1317, and that relay in turn will close a circuit for corrector magnet 1308. The operation of magnet 1308 steps the brush shaft forward so that the brush 1605 again makes contact with a first segment at the time a reversal is received. It also closes a circuit for auxiliary corrector relay 1317 which restores that relay to its normal position, thus opening the corrector magnet circuit.

Operation of System.

Preparatory adjustments.

In preparing the system for transmission after a period of non-use a series of adjustments are made with timed intervals allotted for each adjustment. The first adjustment is of course, that of the speed of the distributor at the west terminal, which is accomplished by adjusting weights provided for that purpose on fork 401. As the distributor rotates impulses are transmitted from rings 600 and 601 over conductor 703 to drive motor 700 and control the direct current motor (not shown) at the relay station. The attendant at the relay station then adjusts the current through the direct current motor until it is running in step with the incoming pulses. He will then operate key 814, connecting a series of lamps to the receiving segments of strip 802. These lamps are numbered in accordance with the segments of strip 802 to which they are connected. At each revolution of the distributor at the west terminal, five positive impulses, five negative impulses, five positive impulses, five negative impulses and five positive impulses (25 in all) are sent out from transmitters 517, 518, etc., over rings 502, 501, inner left contact of cam 414, conductor 704 of the land cable, outer right contact of cam 711, through meter 721 and the windings of relay 706, inner left contact of cam 711, conductor 705, outer right contact of cam 414 to ground. Relay 706 will close its right contact during the groups of positive pulses and its left contact during the groups of negative pulses. Positive battery will therefore be connected to ring 801 and through brush 818 to ring 802 and the lamps during the reception of pulses 1 to 5, 11 to 15 and 21 to 25, while negative battery will be connected thereto during the reception of pulses 6 to 10 and 16 to 20. Brush 818 is differentially coupled to the drive shaft so as to be capable of manual adjustment relative thereto without interfering with the driving. The lamps are connected to positive battery; hence only those lamps to which negative pulses are directed will be lighted. Brush 818 will then be adjusted until lamps 6 to 10 and 16 to 20, that is those connected to channels No. 2 and No. 4, are lighted. The pulses are then being received at the relay station in the same order and relation as they are sent out from the west terminal.

At the end of the interval allotted for the above adjustments, say three minutes, the attendant at the relay station will restore switch 814, directing incoming pulses to the storing relays 803 to 807, and will make certain that the local switch 750 is in its sending position, which is that shown. The attendant at the west terminal will operate phasing switch 522. With this switch thrown, the series of pulses sent out for each revolution over the local cable will consist of two negative, three positive each for channels No. 1 and No. 2, five negative for channel No. 3, and two positive, three negative each for channels No. 4 and No. 5. These pulses will be received at the relay station on the storing relays 803 to 807. Relays 803 and 804 impress on conductors 809 and 810, and hence on the first two segments of an outgoing channel the same polarity as that received, but relays 805, 806 and 807 impress on conductors 811, 812 and 813, and hence on the last three segments of an outgoing channel, the opposite polarity to that received. The series of pulses transmitted to the cable will therefore consist of twelve negative pulses followed by thirteen positive pulses.

As soon as these pulses begin to arrive at the east terminal, as indicated by the operation of meter 1322, the attendant at that terminal will operate switch 1222, directing the incoming signals to a series of lamps arranged in a circle. These lamps are connected to positive battery so that only those lamps connected to segments over which negative pulses are arriving will be lighted. The distributor at this terminal has been previously set running and the corrector key moved to its open position. If the speed of this distributor is exactly the same as that at the west terminal the same lamps will be lighted at each revolution. If the speeds differ the group of lighted lamps will move in one direction or the other. Since it is desired that this distributor run slightly slower than that at the west terminal, the attendant will then adjust the speed until the group of lighted lamps moves backward very slowly, say one lamp in 48 seconds. From five to ten minutes would be allotted for this operation after which the keys 522 and 1222 are restored to normal.

The next adjustment is that of the correcting mechanism. As a preliminary, the timing mechanism at each station is set to zero. To do so, the attendant at the west terminal, for example, disengages latch 610 and rotates cam 609, lowering the gears on shaft 607 away from the driving gears of timing cams 611, 612 and 613. These cams are now set at zero by means of dials and markers on the supporting frame, as is also shaft 607. The contact operating arm 620 is moved into cooperation with a timing cam giving a closure at the end of one minute intervals. Shaft 621 is then drawn back, opening clutch 606, and locked under latch 624. The shaft 607 is then restored to engagement with the timing cams. This operation is performed at each station. The attendant at the east station also operates key 1620. At the relay station the latching open of clutch 1015 automatically prepares the circuit of magnet 1017. After a predetermined interval, the attendant at the west terminal operates key 550. When brush 507 is in engagement with the first three segments of the No. 5 channel, a circuit is closed from negative battery, right contact of key 550, first segment of No. 5 channel of ring 502, brush 507, ring 501, inner left contact of cam 414, conductor 704, outer right contact of cam 711, through relay 706, inner left contact of cam 711, outer conductor 705, right contact of cam 414 to ground. Relay 706 closes a circuit from negative battery over its left contact, ring 801, brush 818, first active segment of No. 5 channel of ring 802, through relay 803 to ground. Relay 803 operates, is locked and closes a circuit from negative battery over its right contact, conductor 809, to the first active segment of channel No. 5 of ring 1002, brush 1005, ring 1001, left back contact of relay 751, conductor 752, through the sending network, contact 930 of relay 902, to conductor 900 of the cable. Relay 804 is also operated to transmit a negative impulse. These impulses will, of course, be transmitted at a predetermined time. At the east terminal the signals are amplified and operate line relay 1102, which in turn operates relay 1313. Relay 1314 is operated to close its left contact and complete a circuit from negative battery over the left contact, left middle contact of key 1430, contact of cam 1413, segment of ring 1201, brush 1202, first segment of No. 5 channel of ring 1202, key 1620 in its operated position, winding of magnet 1615 to positive battery, releasing clutch 1606 to start the timing operation.

The third negative impulse is received at the relay station over the third active segment of the No. 5 channel, and is conducted, over the operated contact of latch 1020, winding of relay 1017 to positive battery. Magnet 1017 operates and releases the clutch 1015 to start timing at that station.

The clutch magnet 615 at the west terminal is operated by a circuit from negative battery, outer right contact of key 550, left middle contacts of key 630, winding of magnet 615, inner left contacts of key 630, segments of No. 5 channel of ring 503, brush 508, ring 504, normal contact of phasing switch 522 to ground.

As soon as the timing cams start rotating, key 1620 is restored and key 1530 operated at the east terminal, and lamp switch 222 is operated at the west terminal. The corrector keys are also operated, key 323 to correct backward and key 1323 to correct forward. When the direction of transmission is reversed the attendant at the west terminal adjusts his receiving brushes until the lamps connected to the first twelve segments are lighted.

Due to the no pulse period while transfer is being made and to the change of direction of corrector control it is possible that the distributors may get slightly out of synchronism at that time. To overcome this the corrector brushes and the corrector rings at the west terminal are adjusted after each reversal of direction until the corrector mechanisms bring the distributors into synchronism by a few operations.

After a predetermined number of reversals the phasing and lamp switches are restored and test messages are sent over channels No. 1 and No. 2 to insure that the printers are operating properly. When everything is ready the west terminal transmits instruction as to which of the master timing cams such as 611, 1011 and 1611 is to be used. Immediately following the next change-over, the control lever is moved to the proper cam and the system is ready for the transmission of messages.

*Transmission of letter codes.*

As a further illustration of the operation of the system let it be supposed that the west terminal is transmitting and that sending brush 507 is about to begin a revolution in the position shown. Assuming that the letter J is the next letter to be transmitted over channel No. 1 and L is the next letter to be transmitted over channel No. 2, the tape of transmitter 517 will be punched so that tongues 530, 531, 533, 536, and 539 may close their alternate contacts and tongues 532, 534, 535, 537 and 538 close their normal contacts. Therefore as brush 507 moves over the segments of channels No. 1 and No. 2 a series of pulses will be sent out over conductor 704, consisting of two negative, one positive, one negative and one positive pulse for channel No. 1 and of one negative, one positive, two negative and one positive pulse for channel No. 2. These pulses will also be recorded on the siphon recorders 560 and 561 connected to channels No. 1 and No. 2.

These pulses will cause the operation of relay 706 at the relay station to close the same potentials to the receiving common ring 801. Ring 802 consists of 50 segments only every other of which is used. The active segments are connected to ring 801 near the middle of the time of reception of the corresponding pulse so that the storing relays may be more positively operated. As the brush 818 moves over the active segments of channel No. 1, relay 803 will be operated to close its right contact, relay 804 its right contact, relay 805 its left contact, relay 806 its right contact and relay 807 its left contact.

When brush 818 engages its third active segment, brush 1005 will engage its first signaling segment. The following segment of the channel is grounded as is every other segment throughout the ring. Hence the pulses sent to the cable will be a negative pulse, a ground pulse, another negative pulse, ground pulse, negative pulse, ground pulse, positive pulse, ground pulse, negative pulse and a ground pulse.

As brush 818 passes the first active segment of channel No. 2 relay 803 having completed its function will be reoperated. Similarly relays 804 to 807 will be operated in turn in response to the incoming signals. Relays 803, 805 and 806 will close their right contacts and relays 804 and 807 will close their left contacts. The pulses sent out from the second channel of ring 1002 will therefore be negative, positive, positive, positive and negative each followed by a ground pulse.

A record of these pulses in channels Nos. 1 and 2 is taken on recorders 1006 and 1007 respectively. Since the battery connection of the contacts of storing relays 805, 806 and 807 is the reverse of that for relays 803 and 804, the ring 1000 and the recorder connections are so arranged that the signals are rectified on the recorder tape.

Due to the speed of transmission and the cable attenuation these pulses will be received at the east terminal as a negative pulse of three units length, followed by a one unit positive pulse, a negative pulse of two units length, a positive pulse of three units in length and a one unit negative pulse. The one unit pulses, however, after shaping and amplification are too weak to operate the relays 1101 to 1103 in the output circuit of the amplifier 1100.

Assuming that the previous pulse was negative signal relay 1102 will therefore close its left contact for a three unit period, release for one period, reclose its left contact for two periods, close its right contact for three periods and (assuming that the next pulse or the first impulse in channel No. 3 is not also negative) release for one period.

Since the receiving distributors are in synchronism with the incoming signals brush 1303 will be in the position shown when relay 1102 closes its left contact in response to the first signal. The operation of relay 1102 causes relay 1313 to close its left contact, in turn operating printer relay 1314 to close its left contact. Relay 1314 will close a circuit from negative battery through its left contact, conductor 1350, middle normal contact of key 1430, right contact of cam 1412, conductor 1431, to segment 1230 of ring 1201, brush 1207, first active segment of channel No. 1, winding of the first magnet of printer 1227 to positive battery.

In the meantime with brush 1303 in engagement with the first active segments of rings 1300 and 1301, a circuit was closed from ground, through the vibrating winding of relay 1313, conductor 1351, right normal contact of key 1430, conductor 1432, first active segment of ring 1301, brush 1303, first active segment of ring 1300, right contact of relay 1315, to positive battery. However, due to the current through the holding winding of relay 1313 the current in this circuit is ineffective.

When brush 1303 engages the second active segments, a circuit is closed from negative battery, over the left contact of relay 1313, second active segment of ring 1300, brush 1303, second active segment of ring 1301, winding of relay 1315 to ground, causing relay 1315 to close its right contact.

During the second and third pulse periods relay 1102 holds its left contact closed, in turn causing relays 1313 and 1314 to hold their left contacts closed. Relay 1314 completes the circuit previously traced to ring 1202. Since the second magnet of printer 1227 is also connected to positive battery, that magnet will be operated, but since the third magnet is connected to negative battery that magnet will not be operated. Since relay 1313 holds its left contact closed, relay 1315 will not be affected by the circuits completed through the fourth and sixth active segments of rings 1300 and 1301.

During the fourth pulse period relay 1102 will open both of its contacts and no current will flow through the holding winding of relay 1313. A circuit will be closed from ground through the virbating winding of relay 1313, conductor 1351, key 1430, conductor 1432, seventh conducting segment of rings 1301 and 1300, right contact of relay 1315 to positive battery. Relay 1313 operates in this circuit to close its right contact. It causes relay 1314 to close its right contact and connect positive battery to segment 1230 and through the eighth segment of ring 1202 to the winding of the fourth segment of printer 1227 which operates.

When brush 1303 joins the eighth active segment of rings 1300 and 1301 relay 1315 is operated to close its left contact.

During the fifth and sixth pulse periods relay 1102 will again be operated to close its left contact, in turn causing relays 1313 and 1314 to close their left contacts. The fifth magnet of printer 1227 is connected to negative battery as is the first magnet of printer 1231 and neither magnet will be operated.

With the left contact of relay 1313 closed, the circuit of relay 1315 closed over the tenth active segments of rings 1300 and 1301 will cause it to close its right contact and it will be unaffected by the circuit over the twelfth segments.

During the seventh, eighth and ninth pulse periods, relay 1102 will be operated to close its right contact, in turn causing relays 1313 and 1314 to close their right contacts. Relay 1314 connects positive battery over its right contact to segment 1230 and the windings of the second, third and fourth magnets of printer 1231. The second magnet is connected to negative battery and hence is operated while the third and fourth magnets are connected to positive battery and remain unoperated. Relay 1315 will be operated to close its left contact when brush 1303 connects the fourteenth active segments of rings 1300 and 1301 and is unaffected by the circuits over the sixteenth and eighteenth active segments.

During the tenth pulse period (assuming that the first pulse over the third channel is not also negative) relay 1102 with release and no current will flow through the holding winding of relay 1313.

When brush 1303 joins the nineteenth active segments of rings 1300 and 1301, relay 1315 will close a circuit from negative battery, over its left contact to the vibrating windng of relay 1313. Relay 1313 will close its left contact, causing relay 1314 to close its left contact and apply negative potential to segment 1230. The fifth magnet of printer 1231, being connected to positive battery, will be operated.

As a consequence, therefore, of the transmission of the signal impulses which has been traced in detail the first, second and fourth magnets of printer 1227 and the second and fifth magnets of printer 1231 are operated.

Referring again to the setting of the transmitters, it will be noted that the first, second and fourth tongues of transmitter 517 and the second and fifth tongues of transmitter 518 were moved to their alternate positions. The printers at the east terminal have, therefore, recorded the condition set up on the transmitters at the west terminal.

Returning to the west terminal, as soon as the brushes of the sending distributor entered the second channel, a circuit was closed from battery, through magnet 540 of the first channel, through the left winding and normal contact of relay 541, and also through the right winding of relay 541, left contact of cam 415 to the second channel segments of ring 503, brush 508, ring 504, to ground over a contact of switch 522. Magnet 540 operates and advances the tape to the next position. Relay 541 as it is differentially wound does not operate unless the contact of cam 415 is opened, in which case relay 541 operated holds the transmitter operated until cam contact 415 again closes. When brush 508 leaves the second channel magnet 540 releases. The tape on the remaining transmitters is advanced in a similar manner.

The printers 1227 etc. are operated and their magnets released in local circuits over rings 1203 and 1204.

Conclusion.

It is believed that the foregoing description sets forth the relationship and cooperation of the elements making up the system in such a way as to clearly indicate their coordination in one complete interdependent whole.

What is claimed is:

1. In a telegraph system, a sending distributor having alternate impulse sending and grounding elements, transmitting means connected to impulse sending elements for transmitting impulses of positive and negative polarities, a long cable, a sending shaping network having one terminal connected alternately to said impulse sending and grounding elements by the operation of said distributor and the other terminal connected to said cable, receiving apparatus connected to the other terminal of said cable, said apparatus comprising means for shaping and amplifying the signals, a telegraph printer and a distributor operating synchronously with said first distributor for supplying impulses from said receiving apparatus to said printer.

2. In a telegraph system, a multiplex sending distributor having alternate marking and grounding segments, a plurality of impulse transmitters connected to said marking segments, a long cable, a shunted sending condenser having one terminal connected alternately to said marking and grounding segments by said distributor and the other terminal connected to one terminal of said cable, an impedance having a value smaller than the characteristic impedance of said cable at the signaling frequency connected between said cable terminal and ground, a receiving terminal shaping amplifier having input and output circuits, said input circuit being connected to the other terminal of said cable, a plurality of printing telegraph printers corresponding to said impulse transmitters, and a receiving distributor for connecting said printers to the output circuit of said amplifier.

3. In a telegraph system, a multiplex sending distributor having alternate marking and grounding segments, a plurality of impulse transmitters connected to said marking segments, a long cable, a shunted sending condenser having one terminal connected alternately to said marking and grounding segments by said distributor and the other terminal connected to one terminal of said cable, an impedance having a value smaller than the characteristic impedance of said cable at the signaling frequency connected between said cable terminal and ground, a receiving terminal shaping amplifier having input and output circuits, said input circuit being connected to the other terminal of said cable, a shaping network connected in the input circuit of said amplifier having an impedance several times as high as the characteristic impedance of the cable for all frequencies essential to signaling, a plurality of printing telegraph printers corresponding to said impulse transmitters, and a receiving distributor for connecting said printers to the output circuit of said amplifier.

4. In a submarine telegraph system, multiplex transmitter equipment, a long submarine cable to one terminal of which said transmitter is connected, a receiving shaping electric discharge amplifier having an input circuit connected to the other terminal of said cable and an output circuit, a polar relay connected to be energized by output current from said amplifier, multiplex printer equipment operated from said relay and a resistance condenser network to maintain the normal current in the output circuit of said amplifier within predetermined limits whereby telegraph messages may be received over said cable in printed form.

5. In a submarine telegraph system, a multiplex sending distributor having alternate marking and grounding segments, a plurality of tape transmitters corresponding to the number of message channels, a plurality of polar relays arranged to impress signaling impulses upon said marking segments under the control of said tape transmitters, a long submarine cable, a shunted sending condenser having one terminal connected alternately to said marking and grounding segments by said distributor and the other terminal connected to one terminal of said cable, a circuit comprising resistance and capacity in series connected between said cable terminal and ground, said resistance having a value smaller than the charactertistic impedance of said cable at the signaling frequency and said condenser having a capacity so large as to have negligible impedance for currents of the greater portion of the range of frequencies essential to signaling, but not for the extremely low frequencies, a multi-stage electron discharge amplifier, a transformer coupling said amplifier to the other terminal of said cable, a shaping network connected between said transformer and cable, an interstage shaping network, a receiving distributor having receiving segments and vibrating relay segments, a vibrating relay circuit comprising a vibrating relay, connected between the output circuit of said amplifier and said receiving distributor, the vibration of said relay being determined both by said vibrating relay segments and the incoming signals, a resistance-condenser network maintaining the normal current in the output circuit of said amplifier within predetermined limits, and a plurality of multiplex printers connected to the receiving segments of said receiving distributor, whereby printed telegraph messages may be received over a long submarine cable.

6. A telegraph transmission system comprising distributors, means for maintaining said distributors in synchronism, said means comprising devices responsive to a change in polarity of incoming signals, automatically vibrating relays associated with said distributors, and connections for supplying signals to said vibrating relays comprising unidirectional translating devices for preventing impulses produced by the vibrating relays from being applied to said synchronizing means.

7. A system as in claim 6 in which geographically long separate conductors are employed for supplying signals to said vibrating relay and current reversals to said synchronizing means respectively.

8. In a telegraph system, a long cable, means for impressing signals on said cable comprising a transmitter, a sending shaping network, one terminal of which is connected to said cable, and means for connecting the other terminal of said network alternately to said transmitter and to ground, a connection to ground occurring after each signal impulse and the time of said connections to transmitter and to ground being of substantially the same length.

9. In a telegraph system, a long cable, means for impressing signals on said cable comprising a transmitter, a sending shaping network, one terminal of which is connected to said cable, and means for connecting the other terminal of said network alternately to said transmitter and to ground, a connection to ground occurring after each signal impulse and the length of time of said connections to ground being at least 70% of the length of time of the connections to said transmitter.

10. In a telegraph system, a sending distributor having alternate impulse sending and cable grounding elements of substantially equal length, transmitting means connected to said impulse sending elements, a long cable, a sending shaping network having one terminal connected alternately to said impulse sending and cable grounding elements by the operation of said distributor and the other terminal connected to said cable, receiving apparatus connected to the other terminal of said cable, said appartus comprising means for shaping and amplifying the signals, a telegraph printer and a distributor operating synchronously with said first distributor for supplying impulses from said receiving apparatus to said printer.

11. In a telegraph system, a sending distributor having alternate impulse sending and cable grounding elements, said cable grounding elements being at least 70% as long as said impulse sending elements, transmitting means connected to said impulse sending elements, a long cable, a sending shaping network having one terminal connected alternately to said impulse sending and cable grounding elements by the operation of said distributor and the other terminal connected to said cable, receiving apparatus connected to the other terminal of said cable, said apparatus comprising means for shaping and amplifying the signals, a telegraph printer, and a distributor operating synchronously with said first distributor for supplying impulses from said receiving apparatus to said printer.

In witness whereof, I hereunto subscribe my name this 28th day of June, A. D. 1926.

AUSTEN M. CURTIS.